United States Patent
Matsumoto

(10) Patent No.: US 12,394,974 B2
(45) Date of Patent: Aug. 19, 2025

(54) POWER SUPPLY CONTROL APPARATUS AND POWER SUPPLY CONTROL METHOD

(71) Applicant: DENSO TEN Limited, Hyogo (JP)

(72) Inventor: Takeshi Matsumoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 286 days.

(21) Appl. No.: 18/187,787

(22) Filed: Mar. 22, 2023

(65) Prior Publication Data

US 2023/0344216 A1    Oct. 26, 2023

(30) Foreign Application Priority Data

Apr. 25, 2022   (JP) .................... 2022-071687
Dec. 26, 2022   (JP) .................... 2022-208464

(51) Int. Cl.
*H02H 3/16*    (2006.01)
*H02H 3/02*    (2006.01)

(52) U.S. Cl.
CPC .............. *H02H 3/16* (2013.01); *H02H 3/021* (2013.01)

(58) Field of Classification Search
CPC ................... H02H 3/16; H02H 3/21
USPC ........................................... 361/42
See application file for complete search history.

(56) References Cited

U.S. PATENT DOCUMENTS 11,465,574 B2 *  10/2022  Mazaki ............... H02H 7/28
2018/0354436 A1  12/2018  Sato
2019/0334375 A1  10/2019  Wataru et al.

FOREIGN PATENT DOCUMENTS

| DE | 10 2005 004 330 A1 | 8/2006 |
| DE | 10 2018 205 978 A1 | 11/2018 |
| DE | 11 2017 002 454 T5 | 2/2019 |
| DE | 10 2019 217 698 A1 | 5/2021 |
| DE | 11 2020 003 602 T5 | 4/2022 |
| JP | 2019-062727 A | 4/2019 |

* cited by examiner

*Primary Examiner* — Thienvu V Tran
*Assistant Examiner* — Lauren Ashley Shaw
(74) *Attorney, Agent, or Firm* — Oliff PLC

(57) ABSTRACT

A power supply control apparatus includes: a first connection device provided in an inter-system line that connects a first system as defined herein and a second system as defined herein; a second connection device as defined herein; and a controller that brings the first connection device and the second connection device into a disconnected state and performs a first fail-safe control using the electric power of the first power supply when a ground fault of the second system is detected, and that brings the first connection device into a conductive state while keeping the second connection device in a disconnected state and performs a second fail-safe control using the electric power of the second power supply when a failure of the first power supply is detected during the first fail-safe control.

16 Claims, 17 Drawing Sheets

POWER SUPPLY CONTROL APPARATUS AND POWER SUPPLY CONTROL METHOD

CROSS-REFERENCE TO RELATED APPLICATION

This application is based on and claims priority under 35 USC 119 from Japanese Patent Application No. 2022-071687 filed on Apr. 25, 2022, and Japanese Patent Application No. 2022-208464 filed on Dec. 26, 2022.

TECHNICAL FIELD

The disclosed embodiment relates to a power supply control apparatus and a power supply control method.

BACKGROUND ART

There is a power supply control apparatus including a first system that supplies electric power of a first power supply to a first load, a second system that supplies electric power of a second power supply to a second load, and an inter-system separator capable of connecting and disconnecting the first system and the second system (for example, see JP2019-62727A).

When a ground fault of the first system or the second system is detected, the power supply control apparatus separates the first system and the second system by the inter-system separator, determines a ground fault system, and uses a system without the ground fault to perform a fail-safe control.

SUMMARY OF INVENTION

However, for example, during a fail-safe control using the first system due to a ground fault of the second system, the power supply control apparatus cannot continue the fail-safe control when an abnormality occurs in the first power supply.

An aspect of the embodiment has been made in view of the above circumstance, and an object thereof is to provide a power supply control apparatus and a power supply control method capable of continuing, during a fail-safe control using a first system due to a ground fault of a second system, the fail-safe control even when an abnormality occurs in a first power supply.

A power supply control apparatus according to an aspect of an embodiment includes a first connection device, a second connection device, and a controller. The first connection device is provided in an inter-system line that connects a first system configured to supply electric power of a first power supply to a first system load and a second system configured to supply electric power of a second power supply to a second system load. The second connection device is provided between the second system load and a connection point between the second system and the inter-system line. The controller brings the first connection device and the second connection device into a disconnected state and performs a first fail-safe control using the electric power of the first power supply when a ground fault of the second system is detected, and brings the first connection device into a conductive state while keeping the second connection device in a disconnected state and performs a second fail-safe control using the electric power of the second power supply when a failure of the first power supply is detected during the first fail-safe control.

The power supply control apparatus and a power supply control method according to the aspect of the embodiment have an effect capable of continuing, during a fail-safe control using the first system due to the ground fault of the second system, the fail-safe control even when an abnormality occurs in the first power supply.

DETAILED DESCRIPTION OF THE INVENTION

Hereinafter, embodiments of a power supply control apparatus and a power supply control method will be described in detail with reference to the accompanying drawings. The present invention is not limited to the following embodiments. Hereinafter, a power supply control apparatus mounted on a vehicle that has an automatic driving function and supplying electric power to a load will be described as an example, but the power supply control apparatus according to the embodiment may be mounted on a vehicle that does not have the automatic driving function.

Further, a case where the vehicle on which the power supply control apparatus is mounted is an electric vehicle or a hybrid vehicle will be described, but the vehicle on which the power supply control apparatus is mounted may be an engine vehicle traveling by an internal combustion engine.

The power supply control apparatus according to the embodiment includes a first power supply and a second power supply. When a power supply failure occurs in a power supply system of either the first power supply or the second power supply, the power supply control apparatus may be mounted on any apparatus that backs up the first power supply by the other power supply system.

Figure 1:
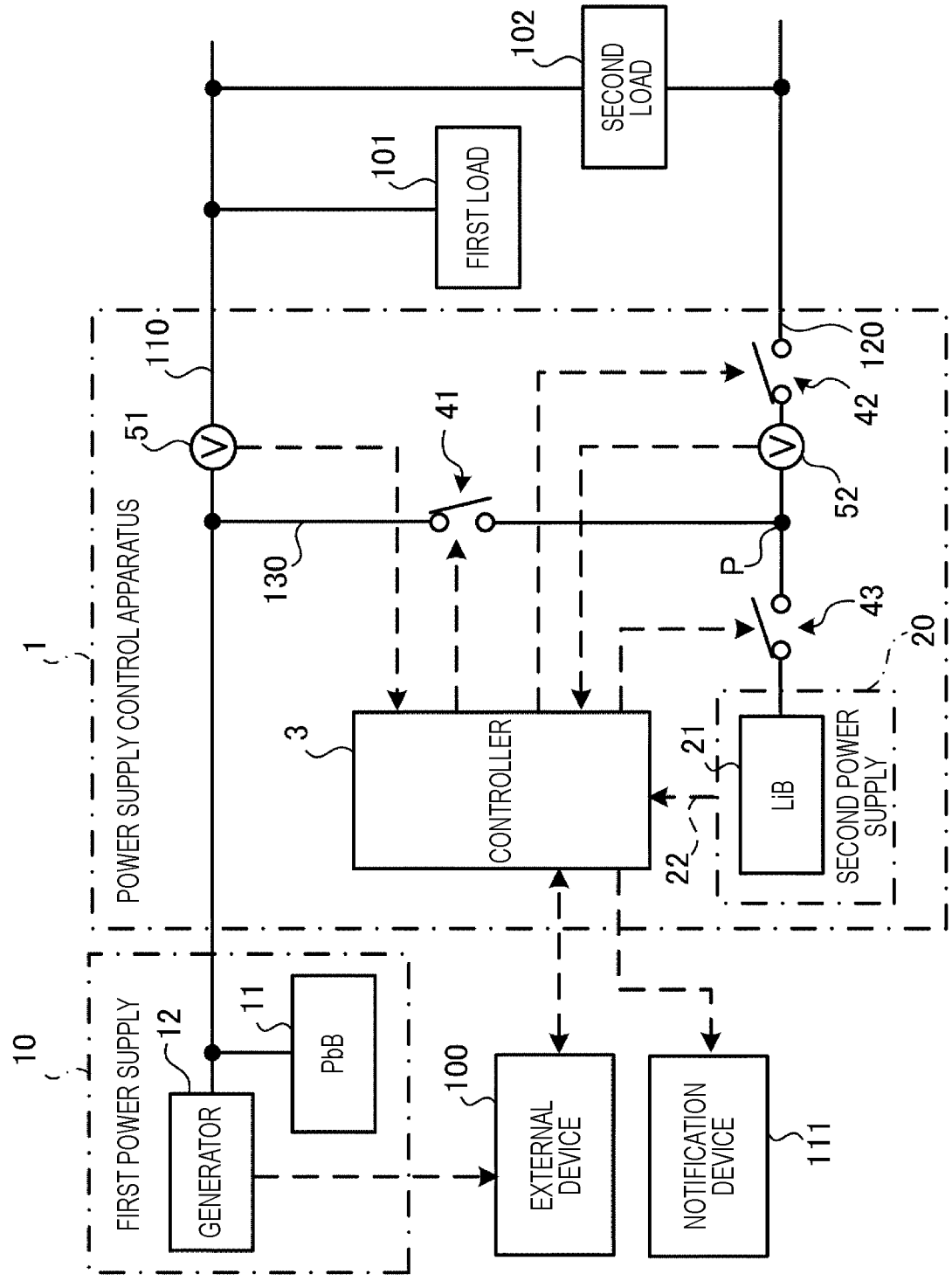
FIG. 1 is an explanatory diagram showing a configuration example of a power supply control apparatus according to a first embodiment.

1. Configuration of Power Supply Control Apparatus According to First Embodiment FIG. 1 is an explanatory diagram showing a configuration example of a power supply control apparatus according to a first embodiment. As shown in FIG. 1, a power supply control apparatus 1 according to the first embodiment is connected to a first power supply 10, a first load 101, a second load 102, an external device 100, and a notification device 111.

The notification device 111 is, for example, a DIAG lamp that notifies a driver of an abnormality of a vehicle or the like. The notification device 111 may be a warning device that outputs a display or a sound to notify the driver of the abnormality of the vehicle or the like.

The power supply control apparatus 1 includes a first system 110 that supplies electric power of the first power supply 10 to the first load 101 and the second load 102 which are first system loads, and a second system 120 that supplies electric power of a second power supply 20 to be described later to the second load 102 which is a second system load.

The first load 101 includes, for example, a display, an air conditioner, an audio, a video, and various lights. The second load 102 includes a load for automatic driving. For example, the second load 102 includes a steering motor, an electric brake device, various sensors, and an in-vehicle camera that operate during the automatic driving. The first load 101 and the second load 102 are operated by electric power supplied from the power supply control apparatus 1.

The second load 102 is supplied with electric power from both the first system 110 and the second system 120, but the second load 102 may be different loads with the same function. For example, the second load 102 is an in-vehicle camera and a radar for recognition. In this case, one load is supplied with electric power from the first system, and the other load is supplied with electric power from the second system.

The external device 100 is, for example, an automatic driving control device. The external device 100 may be an electronic control unit (ECU) that controls the entire vehicle. The external device 100 causes the vehicle to travel by automatic driving by operating the second load 102.

The first power supply 10 includes a lead battery (hereinafter, referred to as a "PbB 11") and an electrical power generator 12. A battery of the first power supply 10 may be any secondary battery other than the PbB 11. The external device 100 monitors a state of the generator 12 and transmits a notification indicating the state of the generator 12 to the power supply control apparatus 1.

The generator 12 includes a DC/DC converter that is connected to a high-voltage battery having a voltage higher than that of the PbB 11, steps down the voltage of the high-voltage battery, and outputs the stepped-down voltage to the first system 110. Further, the generator 12 includes, for example, an alternator that converts kinetic energy of a traveling vehicle into electricity to generate electricity.

The high-voltage battery is, for example, a battery for driving a vehicle mounted on an electric vehicle or a hybrid vehicle. The generator 12 charges the PbB 11, supplies electric power to the first load 101 and the second load 102, and charges the second power supply 20 to be described later.

The power supply control apparatus 1 includes the second power supply 20, a first connection device 41, a second connection device 42, a third connection device 43, a controller 3, a first voltage sensor 51, and a second voltage sensor 52. Hereinafter, bringing the first connection device 41, the second connection device 42, and the third connection device 43 into a conductive state may be referred to as turning on, and bringing these connection devices into a disconnected state may be referred to as turning off.

The second power supply 20 is a backup power supply for a case where the electric power cannot be supplied by the first power supply 10. The second power supply 20 includes a lithium ion battery (hereinafter, referred to as a "LiB 21"). A battery of the second power supply 20 may be any secondary battery other than the LiB 21.

The first connection device 41 is a switch provided in an inter-system line 130 that connects the first system 110 and the second system 120, and capable of connecting and disconnecting the first system 110 and the second system 120. The first connection device 41 may be a DC/DC converter that establishes conduction between the first system 110 and the second system 120 by being activated, and disconnects the first system 110 and the second system 120 by stopping an operation.

The second connection device 42 is a switch provided between the second load 102 and a connection point P between the second system 120 and the inter-system line 130. The third connection device 43 is a switch that connects the second power supply 20 to the second system 120.

The first voltage sensor 51 is provided in the first system 110, detects a voltage of the first system 110, and outputs a detection result to the controller 3. The second voltage sensor 52 is provided in the second system 120, detects a voltage of the second system 120, and outputs a detection result to the controller 3.

The controller 3 includes various circuits and a microcomputer including a central processing unit (CPU), a read only memory (ROM), a random access memory (RAM), and the like. The controller 3 may be implemented by hardware such as an application specific integrated circuit (ASIC) or a field programmable gate array (FPGA).

The controller 3 controls an operation of the power supply control apparatus 1 by the CPU executing a program stored in the ROM using the RAM as a work area. The controller 3 turns on the first connection device 41 and the second connection device 42 and turns off the third connection device 43 when being activated.

The controller 3 detects a ground fault of the first system 110 or the second system 120 based on the detection results input from the first voltage sensor 51 and the second voltage sensor 52. The controller 3 turns on the first connection device 41 in normal operations during automatic driving and during non-automatic driving, and turns off the first connection device 41 when the ground fault of the first system 110 or the second system 120 is detected. A specific example of a method for detecting the ground fault by the controller 3 will be described later.

When the ground fault of the first system 110 or the second system 120 is detected, the controller 3 notifies the external device 100 of the fact. When the ground fault of the first system 110 or the second system 120 is detected, the controller 3 outputs, to the external device 100, an automatic driving prohibition signal indicating that automatic driving is impossible. When the ground fault of the first system 110 or the second system 120 is not detected, the controller 3 outputs, to the external device 100, an automatic driving permission signal indicating that the automatic driving is possible.

When a voltage of the second power supply 20 becomes equal to or lower than a predetermined voltage, the controller 3 outputs, to the external device 100, the automatic driving prohibition signal indicating that the automatic driving is impossible. The predetermined voltage here is a minimum voltage of the second power supply 20 required for backing up the first power supply 10. The voltage of the second power supply 20 and the predetermined voltage here include a concept of state of charge (SOC). For example, the predetermined voltage is a voltage corresponding to SOC of 80%. The predetermined voltage is greater than a threshold for ground fault determination to be described later.

The second power supply 20 includes a measurement device (not shown) that detects a voltage of the LiB 21 and outputs a detection result to the controller 3. If the third connection device 43 is turned off at the time of measuring the voltage of the second power supply 20, the controller 3 cannot measure the voltage of the second power supply 20 because no current flows through the LiB 21. Therefore, at least the third connection device 43 is turned on so that the voltage of the LiB 21 can be detected.

Thereafter, the controller 3 instructs, via a communication line 22, the measurement device of the second power supply 20 to measure the voltage of the LiB 21, acquires voltage information of the LiB 21 from the measurement device via the communication line 22, and detects SOC of the LiB 21.

When a power supply failure such as a ground fault occurs in the first system 110, the controller 3 turns off the first connection device 41 and turns on the third connection device 43 to supply electric power from the second power supply 20 to the second load 102. When the power supply failure such as a ground fault occurs in the second system 120, the controller 3 supplies electric power from the first power supply 10 to the first load 101 and the second load 102 in a state where the first connection device 41 is turned off and the second connection device 42 is turned off.

Accordingly, even if one of the systems has a ground fault during the automatic driving, the power supply control apparatus 1 can use the other system, perform a fail-safe control (hereinafter, referred to as a fail operation (FOP)) for causing the vehicle to perform retreat traveling to a safe place by using the external device 100, and stop the vehicle. Next, operations of the power supply control apparatus 1 will be described with reference to FIGS. 2 to 8.

2. Normal Operation of Power Supply Control Apparatus

Figure 2:
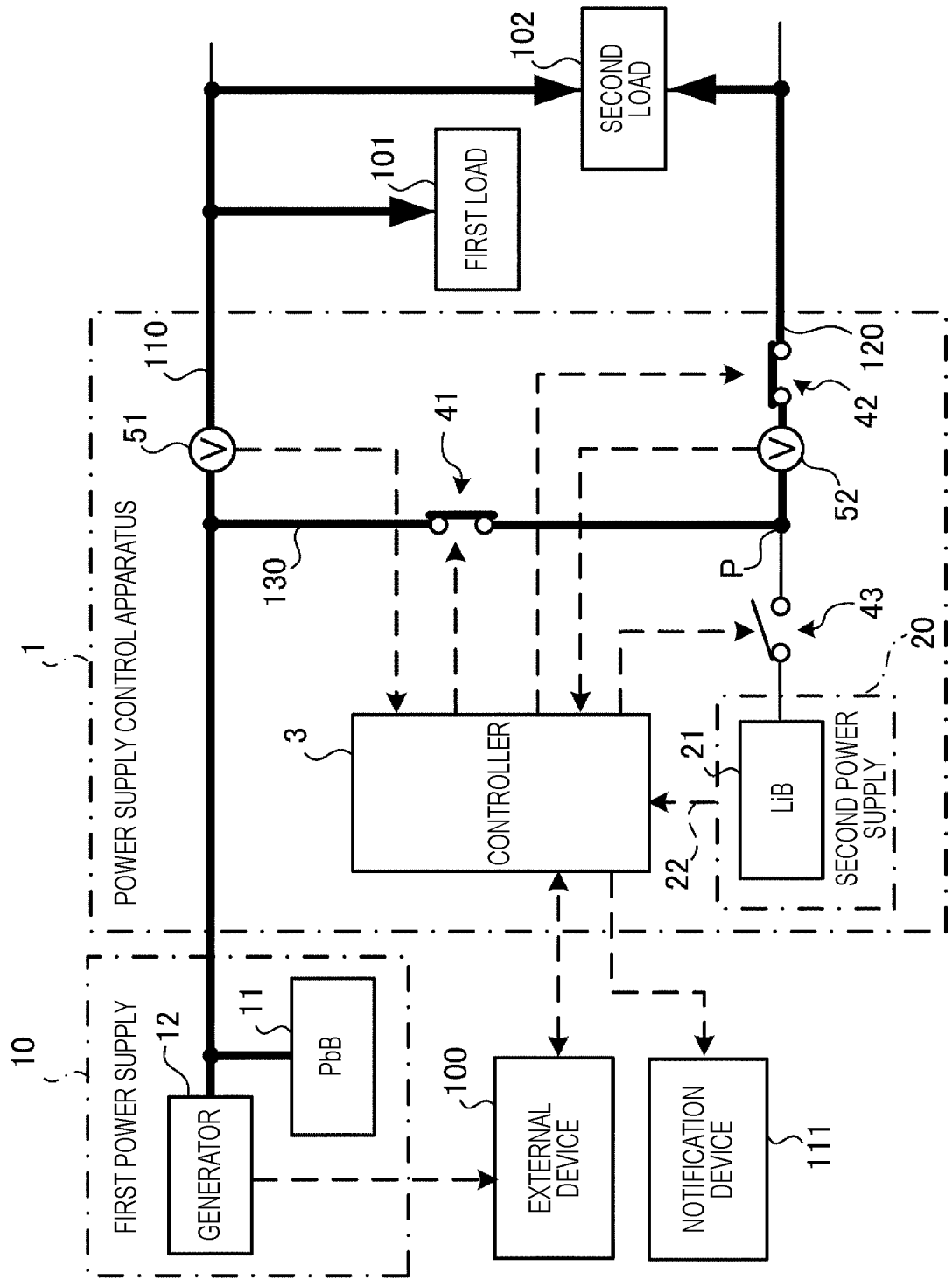
FIG. 2 is an explanatory diagram showing an operation example of the power supply control apparatus according to the first embodiment.

First, a normal operation of the power supply control apparatus 1 will be described with reference to FIG. 2. In a normal operation in which no ground fault occurs in the first system 110 and the second system 120, as shown in FIG. 2, the controller 3 turns off the third connection device 43 and turns on the first connection device 41 and the second connection device 42 to supply electric power from the first power supply 10 to the first load 101 and the second load 102. The controller 3 outputs the automatic driving permission signal to the external device 100 when the voltage of the second power supply 20 is higher than the predetermined voltage in the normal operation in which no ground fault occurs as described above. In this case, the driver of the vehicle can select either automatic driving by using the external device 100 or non-automatic driving by a manual operation.

3. Operations of Power Supply Control Apparatus When Ground Fault Occurs

Figure 3:
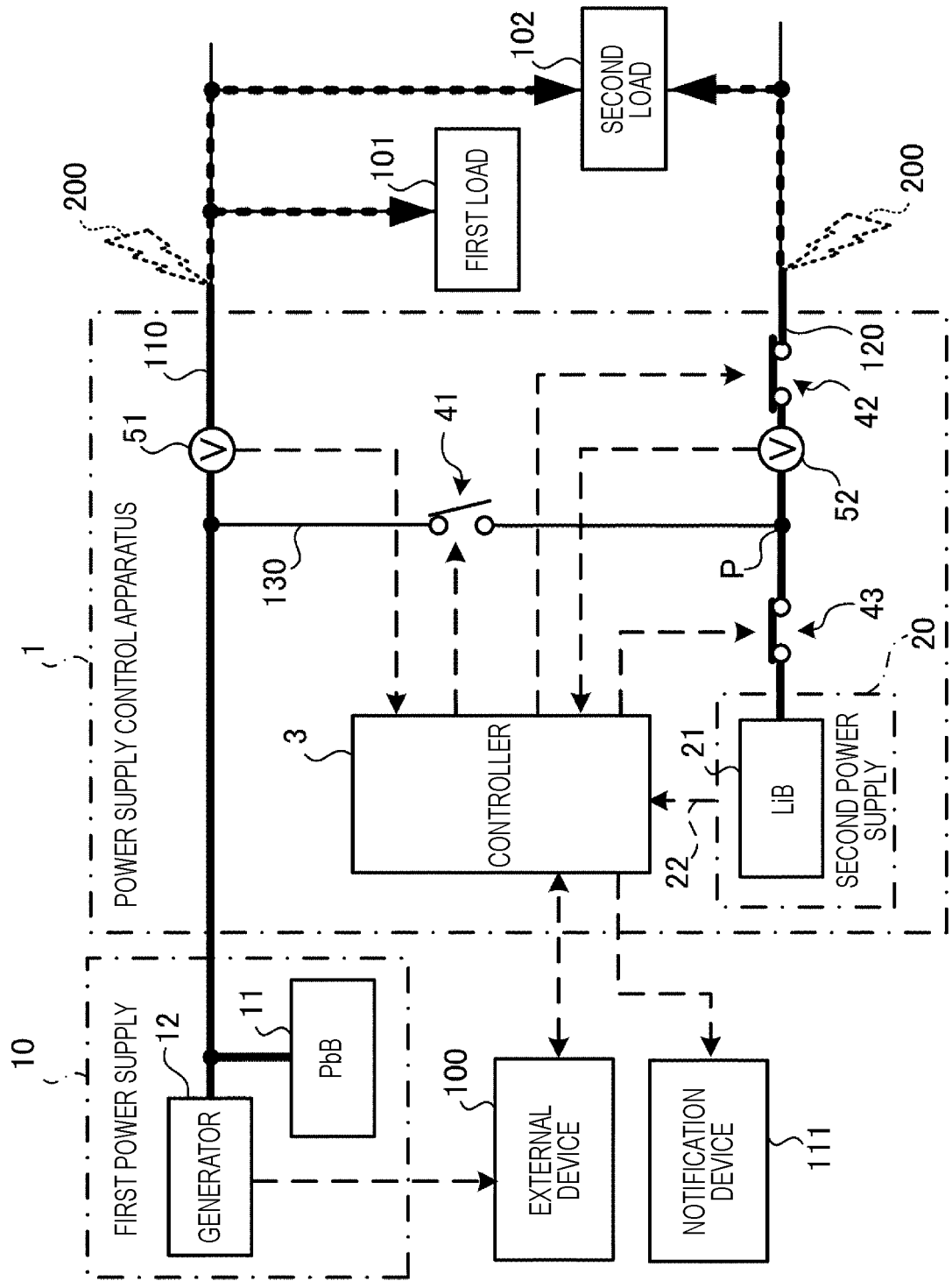
FIG. 3 is an explanatory diagram showing an operation example of the power supply control apparatus according to the first embodiment.

Next, operations of the power supply control apparatus 1 when a ground fault occurs will be described with reference to FIGS. 3 to 8. As shown in FIG. 3, in the power supply control apparatus 1, when a ground fault 200 occurs in the first system 110 or the second system 120, an overcurrent flows toward a ground fault point, and thus the voltages detected by the first voltage sensor 51 and the second voltage sensor 52 become equal to or less than a ground fault threshold.

Therefore, when the voltages detected by the first voltage sensor 51 and the second voltage sensor 52 become equal to or less than the ground fault threshold, the controller 3 temporarily determines that the ground fault 200 occurs in the first system 110 or the second system 120, and outputs the automatic driving prohibition signal to the external device 100.

When it is temporarily determined that the ground fault 200 occurs, the controller 3 turns off the first connection device 41 and turns on the third connection device 43 as shown in FIG. 3. Accordingly, the first system 110 and the second system 120 are disconnected, electric power is supplied from the first power supply 10 to the first system 110, and electric power is supplied from the second power supply 20 to the second system 120.

When the voltage detected by at least one of the first voltage sensor 51 and the second voltage sensor 52 becomes equal to or less than the ground fault threshold, the controller 3 can also temporarily determine that the ground fault 200 occurs in the first system 110 or the second system 120.

The temporary determination may be performed by a hardware circuit including a comparator. In this case, the comparator compares the detection voltages obtained by the first voltage sensor 51 and the second voltage sensor 52 with the ground fault threshold. When the detection voltages become equal to or less than the ground fault threshold, the comparator outputs a ground fault detection signal indicating the temporary determination, turns off the first connection device 41, and turns on the third connection device 43.

Thereafter, when the voltage detected by the first voltage sensor 51 is equal to or less than the ground fault threshold for a predetermined time or more and the voltage detected by the second voltage sensor 52 returns to a value exceeding the ground fault threshold within the predetermined time, the controller 3 finally determines that the ground fault 200 occurs in the first system 110.

Figure 4:
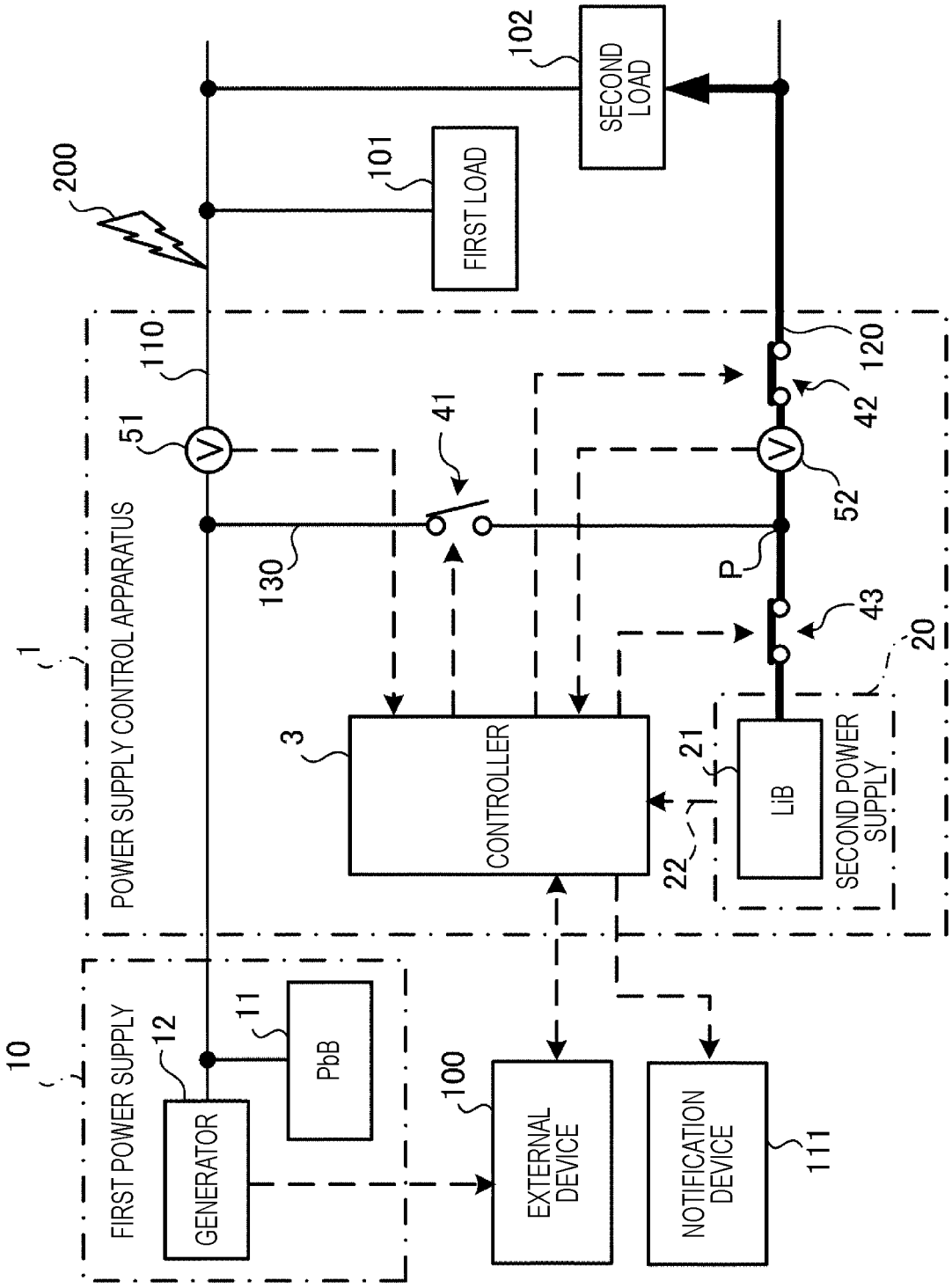
FIG. 4 is an explanatory diagram showing an operation example of the power supply control apparatus according to the first embodiment.

In this case, as shown in FIG. 4, the controller 3 continues the turning off of the first connection device 41 and the turning on of the second connection device 42 and the third connection device 43 to supply electric power from the second power supply 20 to the second load 102, and notifies the external device 100 of the fact.

Accordingly, the external device 100 can operate the second load 102 with the electric power supplied from the second power supply 20 to cause the vehicle to perform the retreat traveling to a safe place and stop the vehicle. The external device 100 may be configured to start the retreat traveling at a time point when the automatic driving prohibition signal is input from the power supply control apparatus 1.

Further, after temporarily determining that the ground fault 200 occurs in the first system 110 or the second system 120, when the voltage detected by the second voltage sensor 52 is equal to or less than the ground fault threshold even after the predetermined time elapses, and the voltage detected by the first voltage sensor 51 returns to a value exceeding the ground fault threshold within the predetermined time, the controller 3 finally determines that the ground fault 200 occurs in the second system 120.

Figure 5:
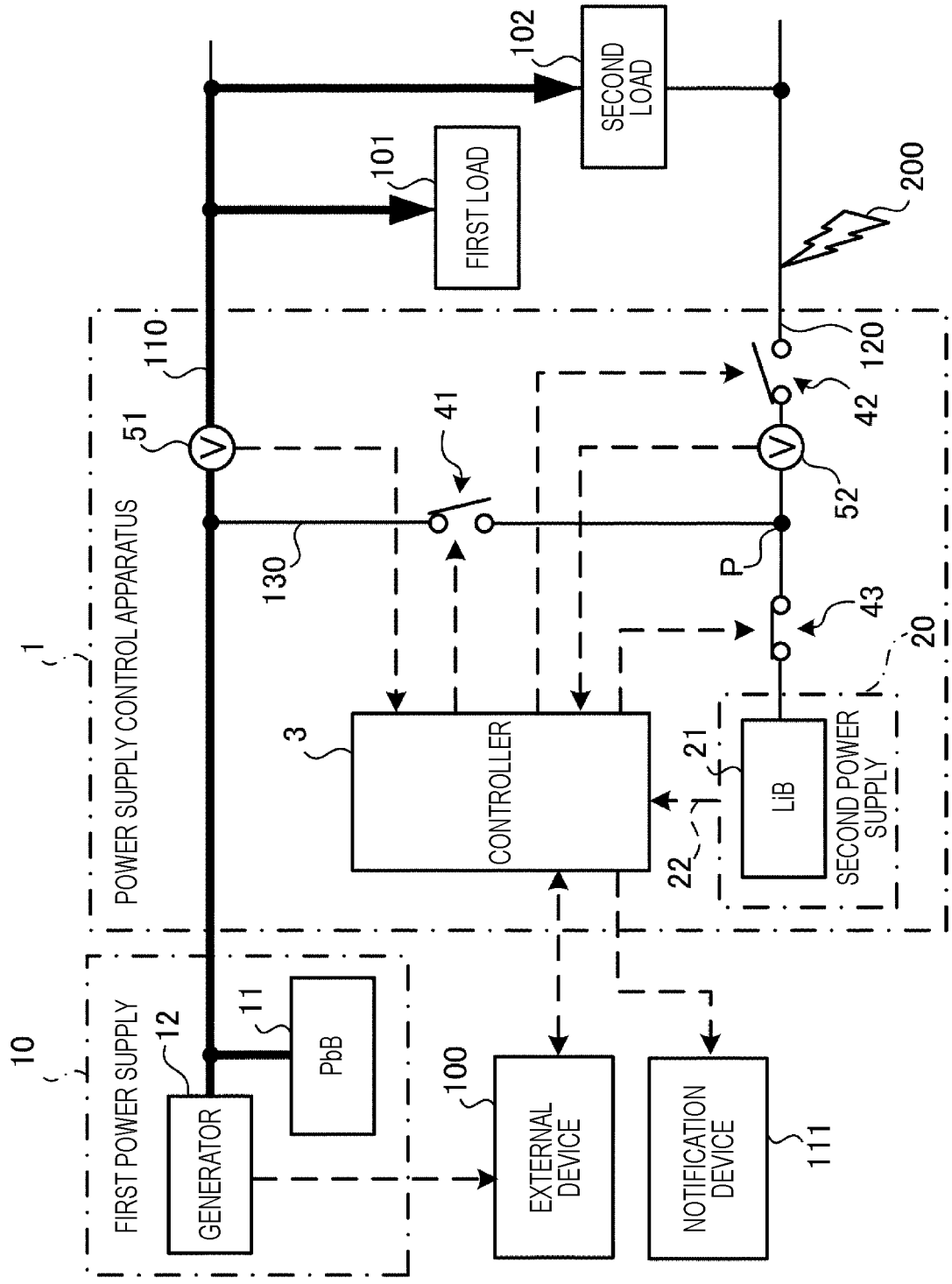
FIG. 5 is an explanatory diagram showing an operation example of the power supply control apparatus according to the first embodiment.

In this case, as shown in FIG. 5, when the ground fault 200 of the second system 120 is detected, the controller 3 turns off the second connection device 42 while continuing the turning off of the first connection device 41, supplies electric power from the first power supply 10 to the first load 101 and the second load 102, notifies the external device 100 of the fact, and performs a first FOP.

Accordingly, the external device 100 can operate the second load 102 with the electric power supplied from the first power supply 10 to cause the vehicle to perform the retreat traveling to a safe place and stop the vehicle. The external device 100 may be configured to start the retreat traveling at a time point when the automatic driving prohibition signal is input from the power supply control apparatus 1.

Further, in the power supply control apparatus 1, when the first load 101 or the second load 102 temporarily becomes an overload state instead of the ground fault 200, the voltage detected by the first voltage sensor 51 may temporarily become equal to or less than the ground fault threshold. In the power supply control apparatus 1, when the second load 102 temporarily becomes the overload state, the voltage detected by the second voltage sensor 52 may temporarily become equal to or less than the ground fault threshold.

In this case, in the power supply control apparatus 1, electric power is continuously supplied from the first power supply 10 to the first load 101 and the second load 102, and electric power is supplied from the second power supply 20 to the second load 102. Therefore, after temporarily determining that the ground fault 200 occurs in the first system 110 or the second system 120, if the voltages detected by the first voltage sensor 51 and the second voltage sensor 52 both return to the values exceeding the ground fault threshold before the predetermined time elapses, the controller 3 finally determines that a transient voltage drop occurs and that there is no abnormality in the power supplies. Thereafter, in order to return to the normal operation shown in FIG. 2, the controller 3 turns off the third connection device 43 and turns on the first connection device 41 again.

When the temporary determination is performed by the hardware circuit, the controller 3 includes the hardware circuit and a CPU. The CPU receives a ground fault detection signal output from the hardware circuit, and the CPU takes over the turning off of the first connection device 41 and the turning on of the third connection device 43. Thereafter, the CPU performs the final determination described above.

4. First Operation Example in First FOP

Next, a first operation example in the first FOP of the power supply control apparatus 1 will be described with reference to FIGS. 6 to 8. In the vehicle, a failure may occur in the first power supply 10 during the first FOP performed when the ground fault 200 occurs in the second system 120.

The controller 3 detects that the first power supply 10 is failed when receiving a notification indicating an abnormality of the generator 12 from the external device 100. Accordingly, the controller 3 can reliably detect the failure of the first power supply 10. When the failure occurs in the first power supply 10, the external device 100 cannot continue the first FOP because electric power is no longer supplied from the first power supply 10 to the second load 102.

Figure 6:
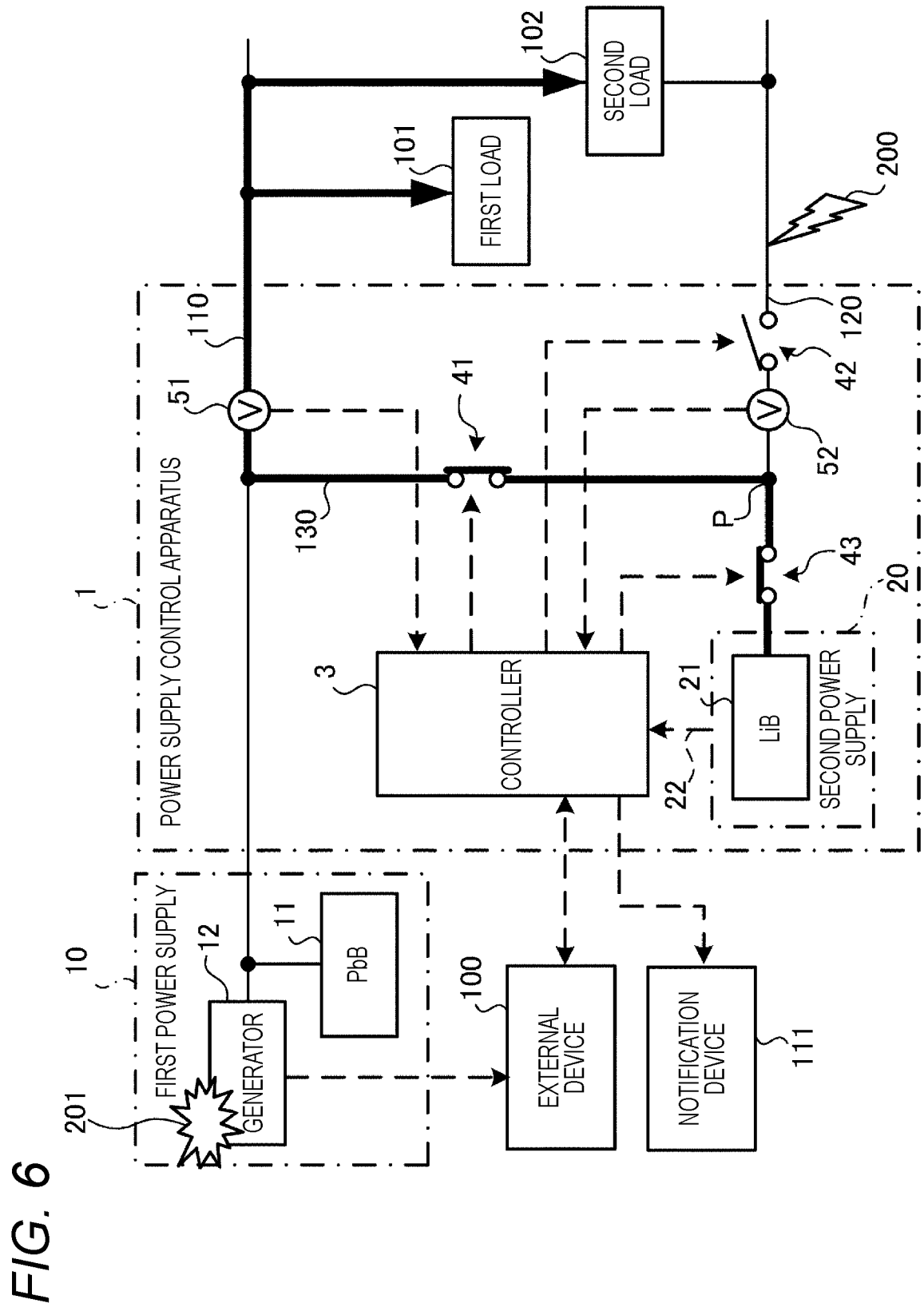
FIG. 6 is an explanatory diagram showing an operation example of the power supply control apparatus according to the first embodiment.
Figure 7:
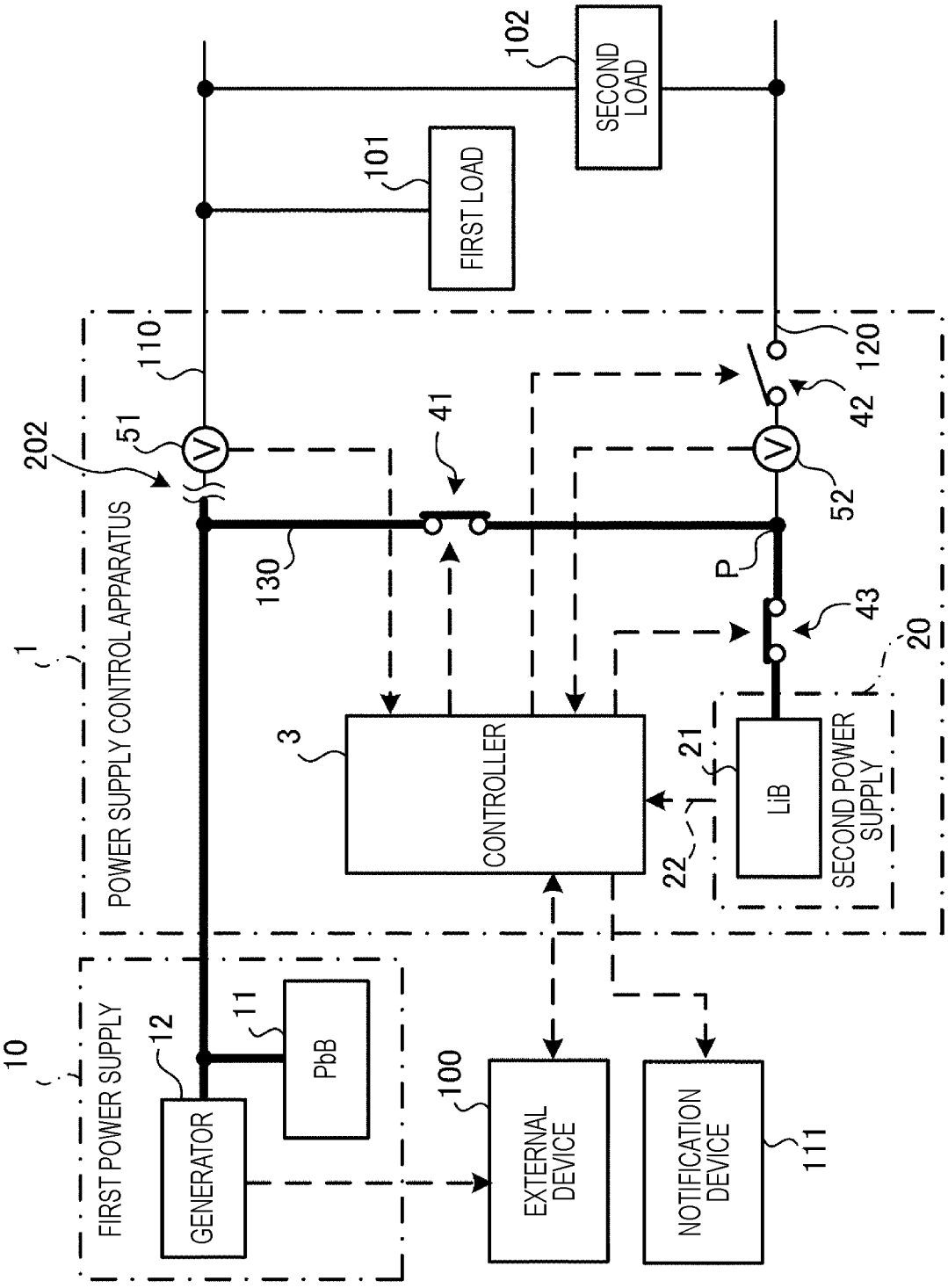
FIG. 7 is an explanatory diagram showing an operation example of the power supply control apparatus according to the first embodiment.

As shown in FIG. 6, when a failure 201 of the first power supply 10 is detected during the first FOP, the controller 3 turns on the first connection device 41 while keeping the second connection device 42 off, and performs a second FOP with the electric power of the second power supply 20.

Accordingly, the power supply control apparatus 1 can supply electric power from the second power supply 20 to the second load 102 via the third connection device 43 and the first connection device 41, and thus even when the failure occurs in the first power supply 10, the power supply control apparatus 1 can cause the external device 100 to continue the second FOP and cause the vehicle to perform the retreat traveling.

Thereafter, the controller 3 monitors the detection result of the first voltage sensor 51, and keeps the first connection device 41 on if the voltage of the first system 110 returns to an operable voltage of the second load 102 as a result of performing the second FOP.

This means that the ground fault 200 of the second system 120 occurs between the second connection device 42 and the second load 102 as shown in FIG. 6. Therefore, if the second connection device 42 is turned off, a ground fault point of the second system 120 can be disconnected from the second power supply 20, and the electric power of the second power supply 20 can be supplied to the first system 110. Accordingly, even when the failure occurs in the first power supply 10 during the first FOP, the power supply control apparatus 1 can safely continue the second FOP.

In the vehicle, during the second FOP, a disconnection or the ground fault 200 may occur in the first system 110. As shown in FIG. 7, when a disconnection 202 occurs in the first system 110, no voltage is applied to the first voltage sensor 51. The same applies to a case where the ground fault 200 occurs in the first system 110.

Figure 8:
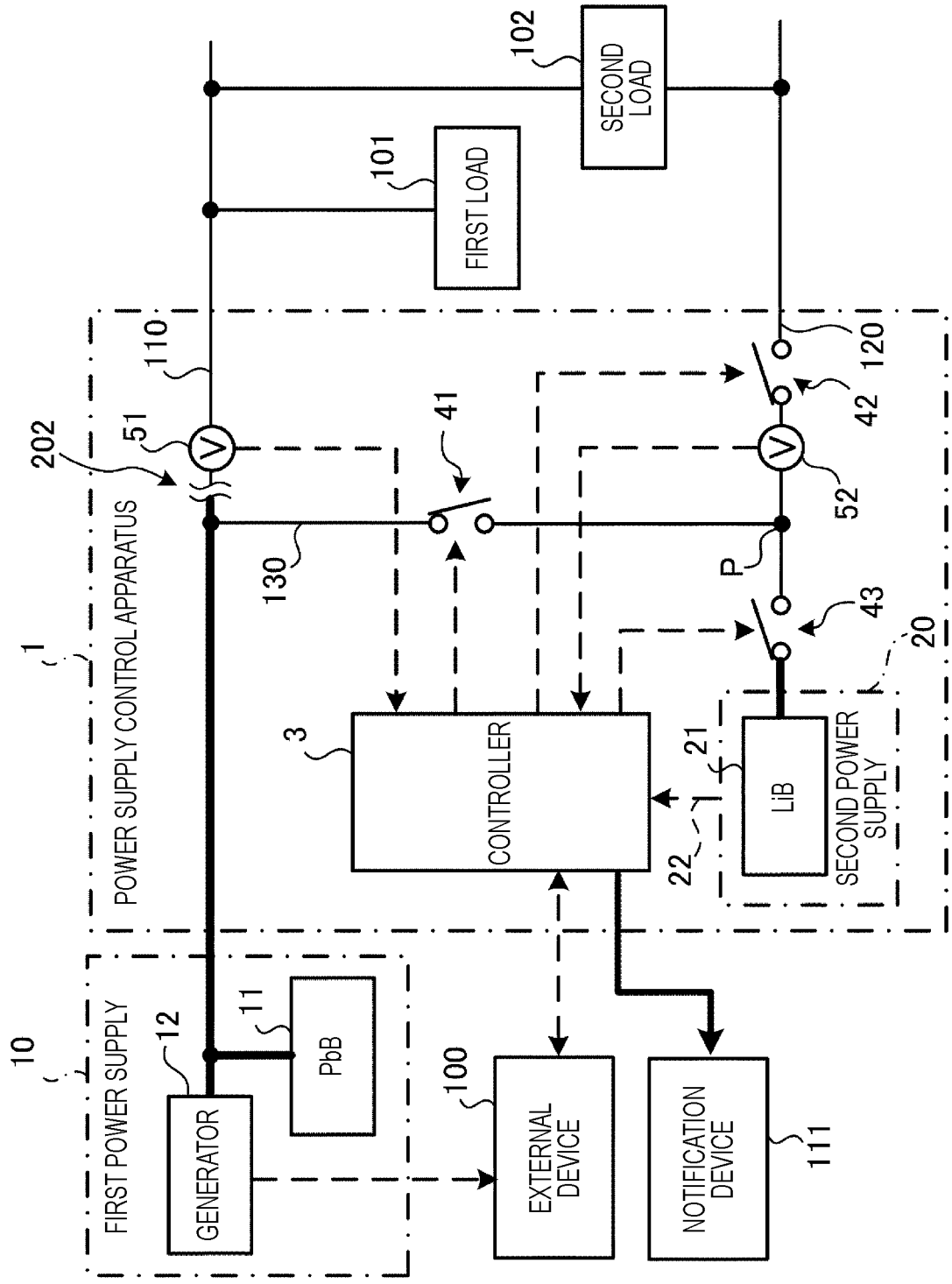
FIG. 8 is an explanatory diagram showing an operation example of the power supply control apparatus according to the first embodiment.

As shown in FIG. 8, if the voltage of the first system 110 does not return to the operable voltage of the second load 102 as a result of performing the second FOP, the controller 3 determines that the disconnection 202 or the ground fault occurs in the first system 110, and turns off the first connection device 41. Accordingly, when the disconnection 202 or the ground fault occurs in the first system 110, the power supply control apparatus 1 can stop the second FOP and stop the vehicle.

If the voltage of the first system 110 does not return to the operable voltage of the second load 102 as a result of performing the second FOP, the controller 3 causes the notification device 111 to notify that both the first system 110 and the second system 120 are failed. Accordingly, the power supply control apparatus 1 can make the driver of the vehicle recognize that the vehicle is stopped due to the power supply failure.

5. Processing Executed by Controller

Figure 9:
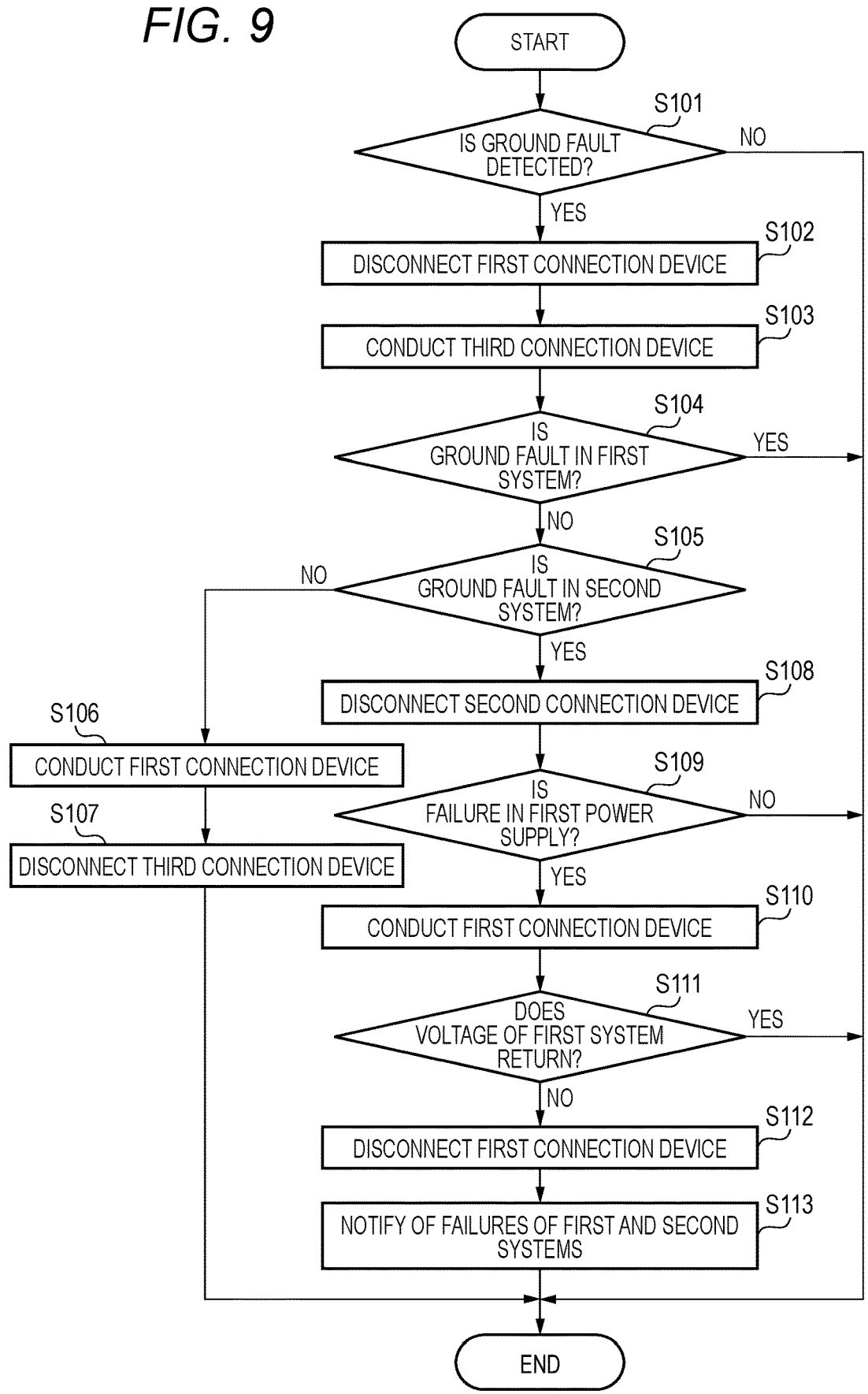
FIG. 9 is a flowchart showing an example of processing executed by a controller of the power supply control apparatus according to the first embodiment.

Next, an example of processing executed by the controller of the power supply control apparatus according to the first embodiment will be described with reference to FIG. 9. FIG. 9 is a flowchart showing the example of the processing executed by the controller of the power supply control apparatus according to the first embodiment.

The controller 3 repeatedly executes the processing shown in FIG. 9 during the normal operation. As described above, in the power supply control apparatus 1, during the normal operation, the first connection device 41 and the second connection device 42 are in a conductive state, and the third connection device 43 is in a disconnected state.

As shown in FIG. 9, first, the controller 3 temporarily determines whether the ground fault 200 of the first system 110 or the second system 120 is detected, based on the detection voltage of the first voltage sensor 51 or the second voltage sensor 52 (step S101). When it is determined that the ground fault 200 is not detected (step S101, No), the controller 3 ends the processing, and starts the processing from step S101 again. In a case of detecting a ground fault using the hardware circuit, the controller 3 temporarily determines that the ground fault 200 is detected when the hardware circuit detects that the ground fault detection signal is output.

When it is temporarily determined that the ground fault 200 is detected (step S101, Yes), the controller 3 brings the first connection device 41 into the disconnected state (step S102), and brings the third connection device 43 into the conductive state (step S103).

Then, the controller 3 finally determines whether the ground fault 200 is in the first system 110 based on the detection voltages of the first voltage sensor 51 and the second voltage sensor 52 (step S104). When it is finally determined that the ground fault 200 is in the first system 110 (step S104, Yes), the controller 3 ends the processing. Accordingly, electric power is supplied to the second load 102 by the second power supply 20, and the FOP is performed.

When it is finally determined that the ground fault is not in the first system 110 (step S104, No), the controller 3 finally determines whether the ground fault 200 is in the second system 120 (step S105). When it is finally determined that the ground fault 200 is not in the second system 120 (step S105, No), the controller 3 brings the first connection device 41 into the conductive state (step S106), brings the third connection device 43 into the disconnected state (step S107), and ends the processing. In this way, when it is finally determined that neither the first system 110 nor the second system 120 has the ground fault 200, the controller 3 determines that the ground fault detected in step S101 is a transient voltage drop, returns to a state during the normal operation shown in FIG. 2, and ends the processing.

When it is finally determined that the ground fault 200 is in the second system 120 (step S105, Yes), the controller 3 brings the second connection device 42 into the disconnected state (step S108). At this time, the first connection device 41 and the second connection device 42 are in the disconnected state, and the third connection device 43 is in the conductive state. Accordingly, the controller 3 can perform the first FOP by supplying electric power from the first power supply 10 to the second load 102 while preventing discharge of the second power supply 20.

Thereafter, the controller 3 determines whether the failure 201 occurs in the first power supply 10 (step S109). When it is determined that the failure 201 does not occur in the first power supply 10 (step S109, No), the controller 3 ends the processing. Accordingly, the controller 3 can continue the first FOP.

When it is determined that the failure 201 occurs in the first power supply 10 (step S109, Yes), the controller 3 brings the first connection device 41 into the conductive state (step S110). Accordingly, the controller 3 can perform the second FOP by supplying electric power from the second power supply 20 to the second load 102 via the first connection device 41.

Thereafter, the controller 3 determines whether the voltage of the first system 110 returns (step S111). When it is determined that the voltage of the first system 110 returns (step S111, Yes), the controller 3 ends the processing. Accordingly, the controller 3 can continue the second FOP.

When it is determined that the voltage of the first system 110 does not return (step S111, No), the controller 3 brings the first connection device 41 into the disconnected state (step S112). Thereafter, the controller 3 notifies of the failures of the first system 110 and the second system 120 (step S113), and ends the processing. Accordingly, the controller 3 can stop the second FOP, and make the driver of the vehicle recognize that the failures occur in the first system 110 and the second system 120.

6. Modification of Processing Executed by Controller

Figure 10:
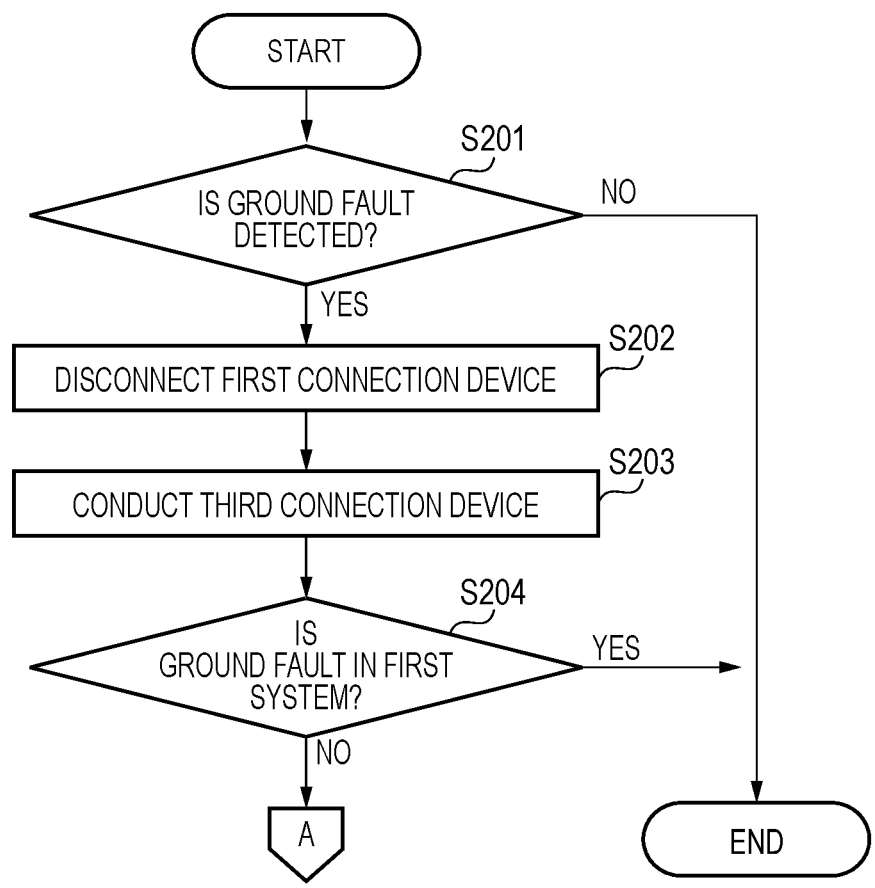
FIG. 10 is a flowchart showing a modification of the processing executed by the controller of the power supply control apparatus according to the first embodiment.
Figure 11:
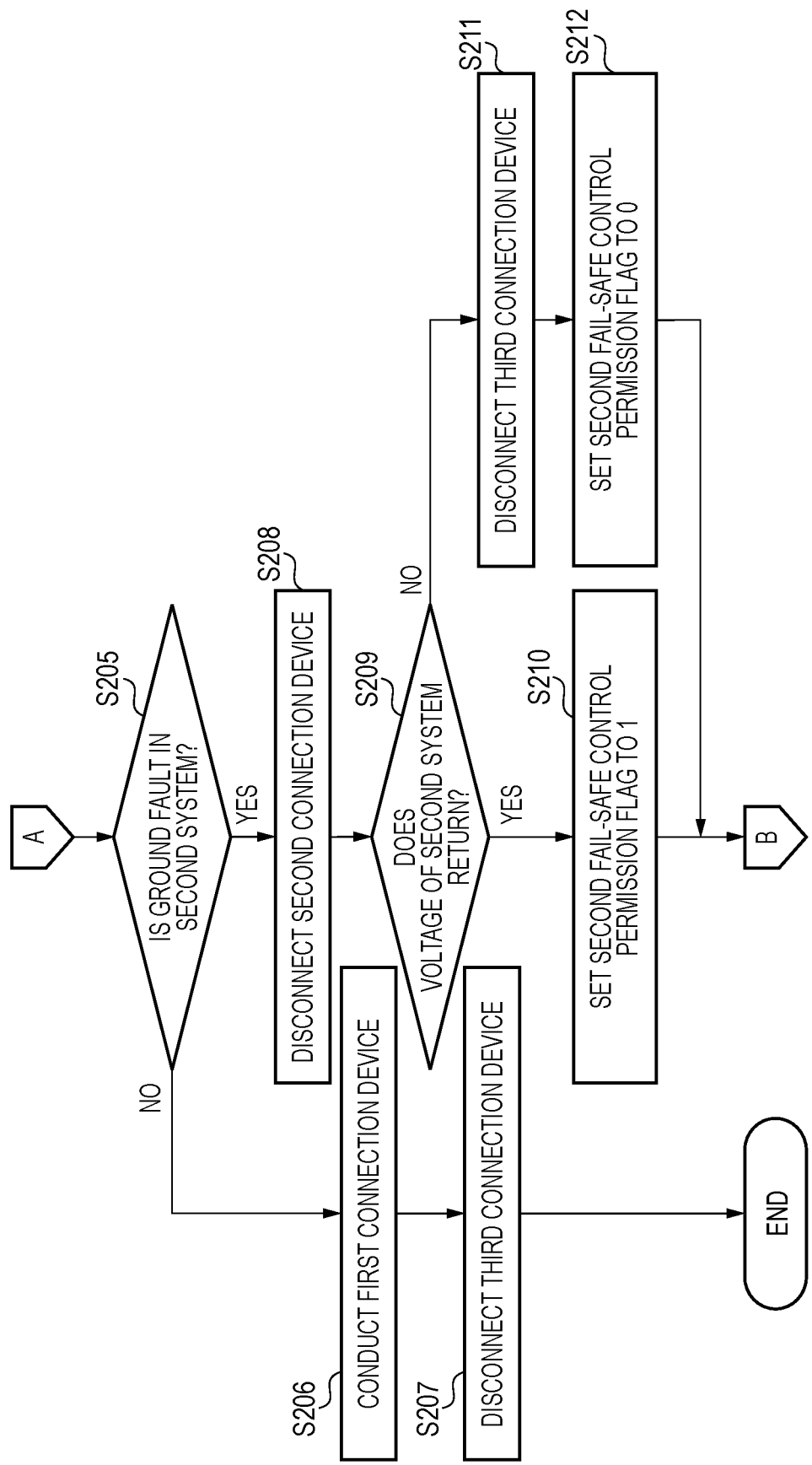
FIG. 11 is a flowchart showing the modification of the processing executed by the controller of the power supply control apparatus according to the first embodiment.
Figure 12:
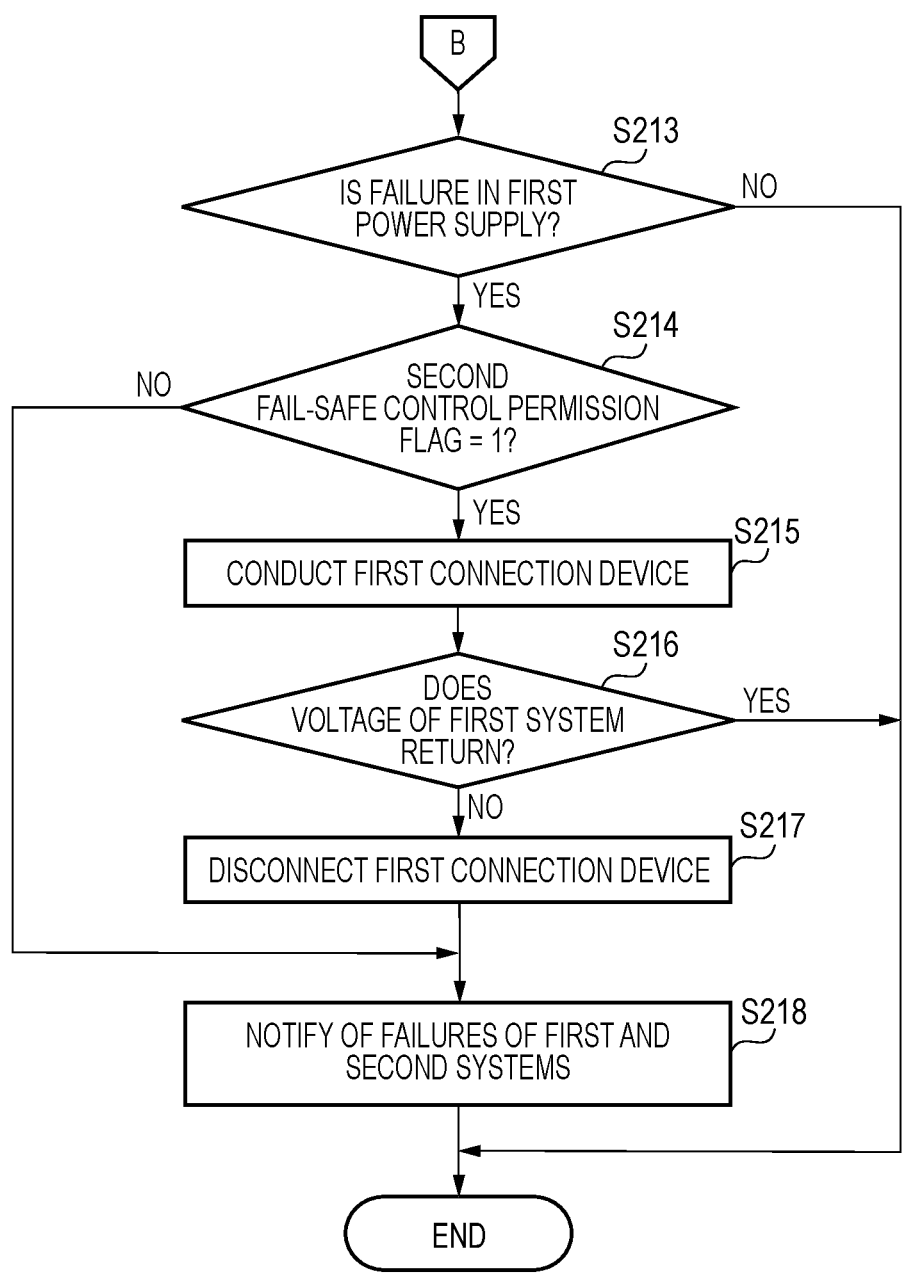
FIG. 12 is a flowchart showing the modification of the processing executed by the controller of the power supply control apparatus according to the first embodiment.

Next, a modification of the processing executed by the controller of the power supply control apparatus according to the first embodiment will be described with reference to FIGS. 10 to 12. FIGS. 10 to 12 illustrate a flowchart showing the modification of the processing executed by the controller 3 of the power supply control apparatus according to the first embodiment.

The controller 3 repeatedly executes processing shown in FIGS. 10 to 12 during the normal operation. As described above, in the power supply control apparatus 1, during the normal operation, the first connection device 41 and the second connection device 42 are in a conductive state, and the third connection device 43 is in a disconnected state.

As shown in FIG. 10, first, the controller 3 temporarily determines whether the ground fault 200 of the first system 110 or the second system 120 is detected, based on the detection voltage of the first voltage sensor 51 or the second voltage sensor 52 (step S201). When it is determined that the ground fault 200 is not detected (step S201, No), the controller 3 ends the processing. Thereafter, the controller 3 starts the processing from step S201 again. In a case of detecting a ground fault using the hardware circuit, the controller 3 temporarily determines that the ground fault 200 is detected when the hardware circuit detects that the ground fault detection signal is output.

When it is temporarily determined that the ground fault 200 is detected (step S201, Yes), the controller 3 brings the first connection device 41 into the disconnected state (step S202). Then, the controller 3 brings the third connection device 43 into the conductive state (step S203).

Subsequently, the controller 3 finally determines whether the ground fault 200 is in the first system 110 based on the detection voltages of the first voltage sensor 51 and the second voltage sensor 52 (step S204). When it is finally determined that the ground fault 200 is in the first system 110 (step S204, Yes), the controller 3 ends the processing. Accordingly, the FOP is performed by using the second power supply 20.

When it is finally determined that the ground fault is not in the first system 110 (step S204, No), the controller 3 advances the processing to step S205 shown in FIG. 11. In step S205, the controller 3 finally determines whether the ground fault 200 is in the second system 120.

When it is finally determined that the ground fault 200 is not in the second system 120 (step S205, No), the controller 3 brings the first connection device 41 into the conductive state (step S206). Then, the controller 3 brings the third connection device 43 into the disconnected state (step S207). Thereafter, the controller 3 ends the processing. In this way, when it is finally determined that neither the first system 110 nor the second system 120 has the ground fault 200, the controller 3 returns to a state during the normal operation shown in FIG. 2, and ends the processing.

When it is finally determined that the ground fault 200 is in the second system 120 (step S205, Yes), the controller 3 brings the second connection device 42 into the disconnected state (step S208). Then, the controller 3 determines whether the voltage of the second system 120 returns to a value exceeding the ground fault threshold (step S209).

Here, the controller 3 has a second fail-safe control permission flag. A state in which the second fail-safe control permission flag is set to "1" is a state in which the second FOP is permitted to be performed. A state in which the second fail-safe control permission flag is set to "0" is a state in which the second FOP is not permitted to be performed.

When it is determined that the voltage of the second system 120 returns to the value exceeding the ground fault threshold (step S209, Yes), the controller 3 determines that a side at the second system load of the second connection device 42 has the ground fault 200. That is, it is determined that the ground fault 200 occurs between the second connection device 42 and the second system load in the second system 120. Then, the controller 3 sets the second fail-safe control permission flag to "1" (step S210). That is, the controller 3 permits the second FOP. Thereafter, the controller 3 advances the processing to step S213 shown in FIG. 12.

When it is determined that the voltage of the second system 120 does not return to the value exceeding the ground fault threshold (step S209, No), the controller 3 determines that a side at the second power supply 20 of the second connection device 42 has the ground fault 200. That is, it is determined that the ground fault 200 occurs between the second connection device 42 and the second power supply 20 in the second system 120. Then, the controller 3 brings the third connection device 43 into the disconnected state (step S211). Thereafter, the controller 3 sets the second fail-safe control permission flag to "0" (step S212). That is, the controller 3 prohibits the second FOP.

In this way, when the ground fault 200 of the second system 120 is detected, the controller 3 determines that a side at the second system load of the second connection device 42 has the ground fault 200 if the voltage of the second system 120 returns by bringing the second connection device 42 into the disconnected state, and determines that a side at the second power supply 20 of the second connection device 42 has the ground fault 200 if the voltage of the second system 120 does not return. Accordingly, the controller 3 can accurately identify an occurrence location of the ground fault 200 in the second system 120.

When the ground fault 200 of the second system 120 is detected, the controller 3 brings the first connection device 41 and the third connection device 43 into the disconnected state to prohibit the second FOP in a case where the ground fault occurs between the second connection device 42 and the second power supply 20. Accordingly, the controller 3 can prevent discharge of the second power supply 20. Therefore, the controller 3 can secure the electric power of the second power supply 20 when the ground fault 200 of the second system 120 is resolved later. Thereafter, the controller 3 advances the processing to step S213 shown in FIG. 12.

In step S213, the controller 3 determines whether the failure 201 occurs in the first power supply 10. When it is determined that the failure 201 does not occur in the first power supply 10 (step S213, No), the controller 3 ends the processing. Accordingly, the controller 3 can continue the first FOP.

When it is determined that the failure 201 occurs in the first power supply 10 (step S213, Yes), the controller 3 determines whether the second fail-safe control permission flag is set to "1" (step S214). When it is determined that the fail-safe control permission flag is not set to "1" (step S214, No), the controller 3 advances the processing to step S218.

When it is determined that the fail-safe control permission flag is set to "1" (step S214, Yes), the controller 3 brings the first connection device 41 into the conductive state (step S215). Accordingly, the controller 3 can perform the second FOP by supplying electric power from the second power supply 20 to the second load 102 via the first connection device 41.

In this way, when the ground fault 200 of the second system 120 is detected, the controller 3 performs the second FOP in a case where the ground fault 200 occurs between the second connection device 42 and the second system load. Accordingly, the controller 3 can reliably perform the second FOP.

Thereafter, the controller 3 determines whether the voltage of the first system 110 returns to a value exceeding the ground fault threshold (step S216). When it is determined that the voltage of the first system 110 returns to the value exceeding the ground fault threshold (step S216, Yes), the controller 3 ends the processing. Accordingly, the controller 3 can continue the second FOP.

When it is determined that the voltage of the first system 110 does not return to the value exceeding the ground fault threshold (step S216, No), the controller 3 brings the first connection device 41 into the disconnected state (step S217). Thereafter, since the ground fault 200 occurs in the second power supply 20 of the second connection device 42 and the failure 201 occurs in the first power supply 10, the controller 3 notifies of the failures of the first system 110 and the second system 120 (step S218). Then, the controller 3 ends the processing. Accordingly, the controller 3 can stop the second FOP, and make the driver of the vehicle recognize that the failures occur in the first system 110 and the second system 120.

Figure 13:
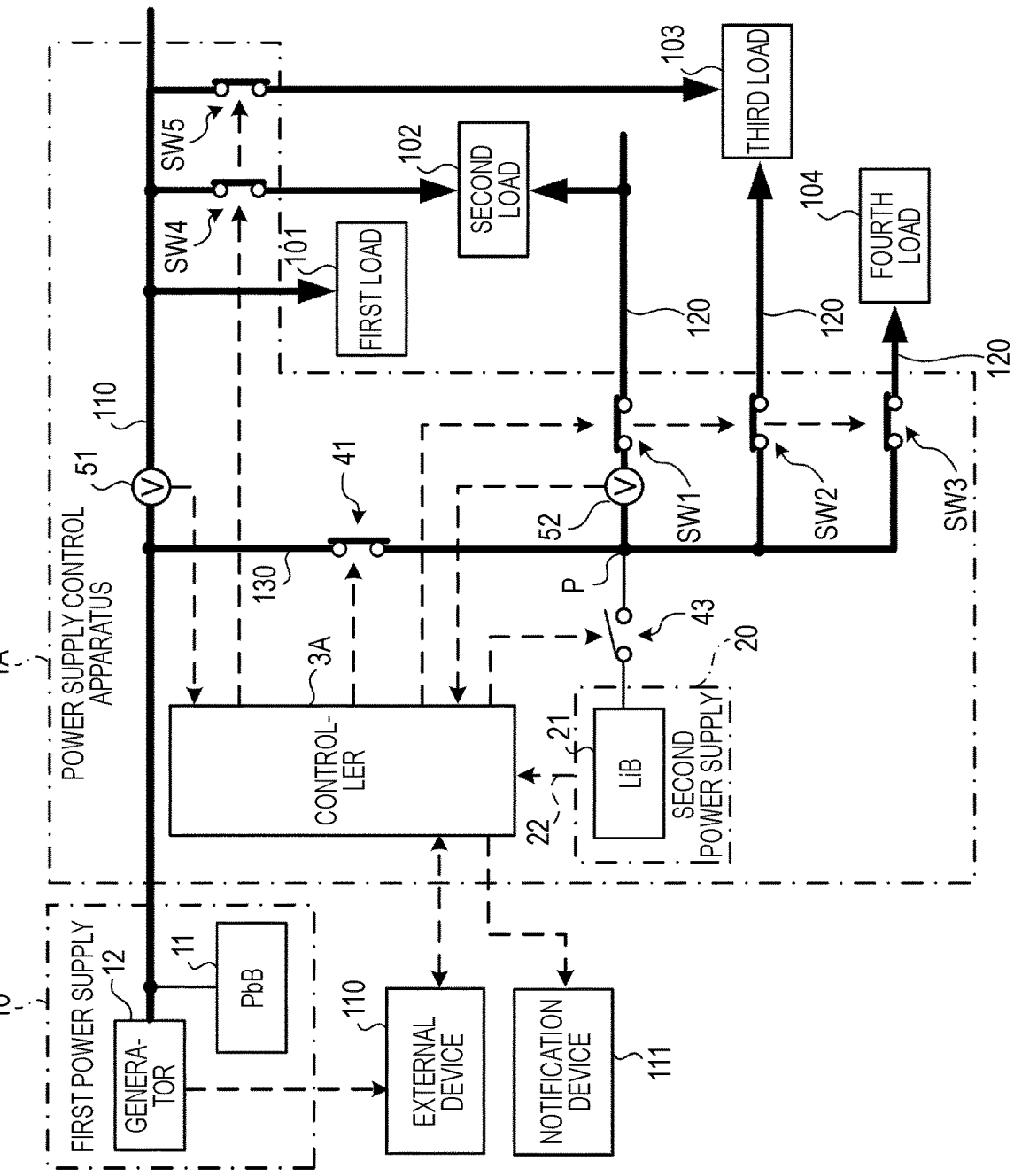
FIG. 13 is an explanatory diagram showing a configuration example of a power supply control apparatus according to a second embodiment.

7. Configuration of Power Supply Control Apparatus According to Second Embodiment Next, a configuration of a power supply control apparatus 1A according to a second embodiment will be described with reference to FIG. 13. FIG. 13 is an explanatory diagram showing a configuration example of the power supply control apparatus 1A according to the second embodiment.

The power supply control apparatus 1A is connected to a plurality of second system loads. In the example shown in FIG. 13, the second load 102, a third load 103, and a fourth load 104 are examples of the second system loads to which electric power is supplied from the second power supply 20 via the second system 120.

A second connection device is provided between each of the plurality of second system loads and the connection point P between the second system 120 and the inter-system line 130. In the example shown in FIG. 13, a first load switch SW1 which is the second connection device is provided between the connection point P and the second load 102. A second load switch SW2 which is the second connection device is provided between the connection point P and the third load 103. A third load switch SW3 which is the second connection device is provided between the connection point P and the fourth load 104.

The first to third load switches SW1 to SW3 are switched between a conductive state and a disconnected state by a controller 3A. The first load switch SW1 electrically connects the connection point P and the second load 102 when brought into the conductive state. The first load switch SW1 disconnects the electrical connection between the connection point P and the second load 102 when brought into the disconnected state.

The second load switch SW2 electrically connects the connection point P and the third load 103 when brought into the conductive state. The second load switch SW2 disconnects the electrical connection between the connection point P and the third load 103 when brought into the disconnected state. The third load switch SW3 electrically connects the connection point P and the fourth load 104 when brought into the conductive state. The third load switch SW3 disconnects the electrical connection between the connection point P and the fourth load 104 when brought into the disconnected state.

In addition, the power supply control apparatus 1A is connected to a plurality of first system loads. In the example shown in FIG. 13, the first load 101, the second load 102, and the third load 103 are examples of the first system loads to which electric power is supplied from the first power supply 10 via the first system 110.

Fourth connection devices are provided between the first system 110 and the plurality of first system loads. In the example shown in FIG. 13, a fourth load switch SW4 which is the fourth connection device is provided between the first system 110 and the second load 102. A fifth load switch SW5 which is the fourth connection device is provided between the first system 110 and the third load 103.

The fourth load switch SW4 and the fifth load switch SW5 are switched between a conductive state and a disconnected state by the controller 3A. The fourth load switch SW4 electrically connects the first system 110 and the second load 102 when brought into the conductive state. The fourth load switch SW4 disconnects the electrical connection between the first system 110 and the second load 102 when brought into the disconnected state.

The fifth load switch SW5 electrically connects the first system 110 and the third load 103 when brought into the conductive state. The fifth load switch SW5 disconnects the electrical connection between the first system 110 and the third load 103 when brought into the disconnected state.

As shown in FIG. 13, the controller 3A brings the first connection device 41 and the first to fifth load switches SW1 to SW5 into the conductive state during a normal operation. The controller 3A brings the third connection device 43 into the disconnected state during the normal operation. In this way, the power supply control apparatus 1A supplies electric power of the first power supply 10 to the first to fourth loads 101 to 104 via the first system 110 and the second system 120.

8. Processing Executed by Controller

Next, an example of processing executed by the controller 3A of the power supply control apparatus 1A according to the second embodiment will be described with reference to FIGS. 10 and 14 to 18. FIGS. 14 to 17 are flowcharts showing examples of the processing executed by the controller 3A of the power supply control apparatus 1A according to the second embodiment. FIG. 18 is a flowchart showing a modification of the processing executed by the controller 3A of the power supply control apparatus 1A according to the second embodiment.

Figure 14:
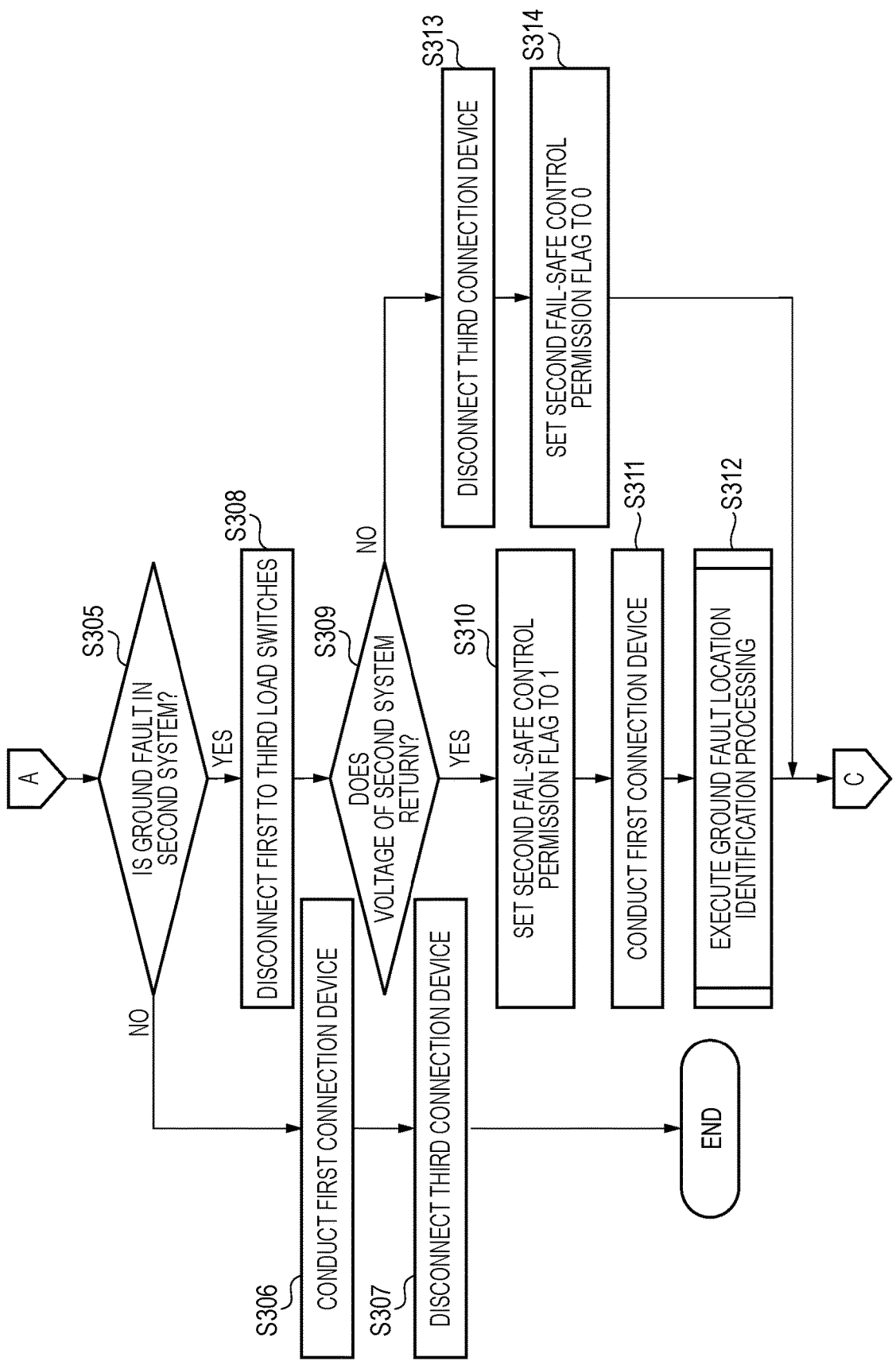
FIG. 14 is a flowchart showing an example of processing executed by a controller of the power supply control apparatus according to the second embodiment.
Figure 15:
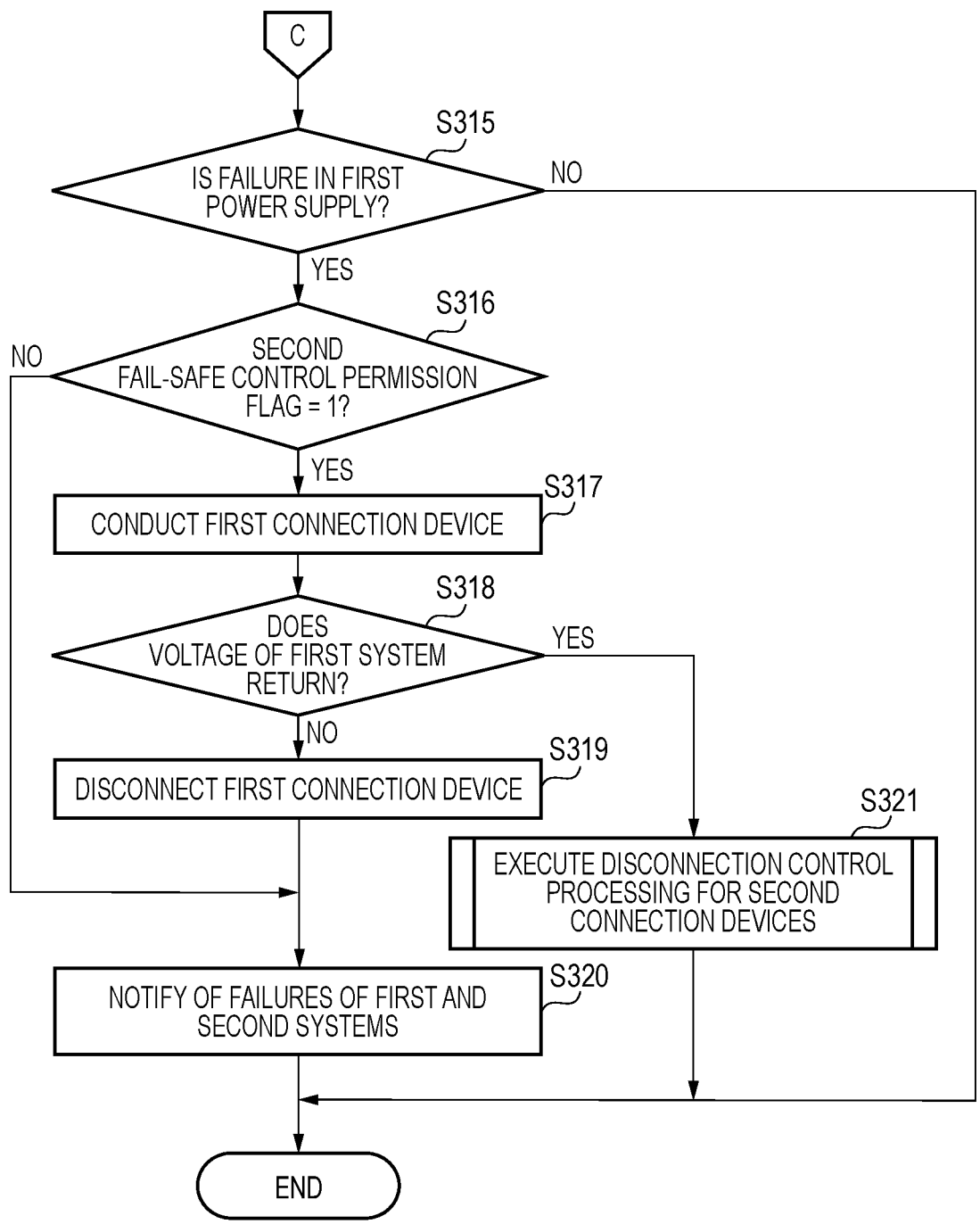
FIG. 15 is a flowchart showing the example of the processing executed by the controller of the power supply control apparatus according to the second embodiment.

During the normal operation, the controller 3A of the power supply control apparatus 1A according to the second embodiment executes the processing of steps S201 to S204 shown in FIG. 10, and then executes processing of steps S305 to S321 shown in FIGS. 14 and 15. In the power supply control apparatus 1A, during the normal operation, the first connection device 41 and the first to fifth load switches SW1 to SW5 are in the conductive state, and the third connection device 43 is in the disconnected state.

As shown in FIG. 10, first, the controller 3A temporarily determines whether the ground fault 200 of the first system 110 or the second system 120 is detected, based on a detection voltage of the first voltage sensor 51 or the second voltage sensor 52 (step S201). When it is determined that the ground fault 200 is not detected (step S201, No), the controller 3A ends the processing. Thereafter, the controller 3A starts the processing from step S201 again. In a case of detecting a ground fault using a hardware circuit, the controller 3A temporarily determines that the ground fault 200 is detected when the hardware circuit detects that a ground fault detection signal is output.

When it is temporarily determined that the ground fault 200 is detected (step S201, Yes), the controller 3A brings the first connection device 41 into the disconnected state (step S202). Then, the controller 3A brings the third connection device 43 into the conductive state (step S203).

Subsequently, the controller 3A finally determines whether the ground fault 200 is in the first system 110 based on detection voltages of the first voltage sensor 51 and the second voltage sensor 52 (step S204). When it is finally determined that the ground fault 200 is in the first system 110 (step S204, Yes), the controller 3A ends the processing. Accordingly, an FOP is performed by using the second power supply 20.

When it is finally determined that the ground fault is not in the first system 110 (step S204, No), the controller 3A advances the processing to step S305 shown in FIG. 14. In step S305, the controller 3A finally determines whether the ground fault 200 is in the second system 120.

When it is finally determined that the ground fault 200 is not in the second system 120 (step S305, No), the controller 3A brings the first connection device 41 into the conductive state (step S306). Then, the controller 3A brings the third connection device 43 into the disconnected state (step S307). Thereafter, the controller 3A ends the processing. In this way, when it is finally determined that neither the first system 110 nor the second system 120 has the ground fault 200, the controller 3A returns to a state during the normal operation shown in FIG. 13, and ends the processing.

When it is finally determined that the ground fault 200 is in the second system 120 (step S305, Yes), the controller 3A brings the first to third load switches SW1 to SW3 which are the second connection devices into the disconnected state (step S308). Then, the controller 3A determines whether a voltage of the second system 120 returns to a value exceeding a ground fault threshold (step S309).

When it is determined that the voltage of the second system 120 returns to the value exceeding the ground fault threshold (step S309, Yes), the controller 3A determines that a side at the second system load of any one of the first to third load switches SW1 to SW3 which are the second connection devices has the ground fault 200.

Then, the controller 3A sets a second fail-safe control permission flag to "1" (step S310). That is, the controller 3A permits a second FOP. Subsequently, the controller 3A brings the first connection device 41 into the conductive state (step S311). Then, the controller 3A executes ground fault location identification processing (step S312). A specific example of the ground fault location identification processing will be described later with reference to FIG. 16. Thereafter, the controller 3A advances the processing to step S315 shown in FIG. 15.

When it is determined that the voltage of the second system 120 does not return to the value exceeding the ground fault threshold (step S309, No), the controller 3A determines that a side at the second power supply 20 of the first to third load switches SW1 to SW3 which are the second connection devices has the ground fault 200.

Then, the controller 3A brings the third connection device 43 into the disconnected state (step S313). Thereafter, the controller 3A sets the second fail-safe control permission flag to "0" (step S314). That is, the controller 3A prohibits the second FOP. Thereafter, the controller 3A advances the processing to step S315 shown in FIG. 15.

In step S315, the controller 3A determines whether the failure 201 occurs in the first power supply 10. When it is determined that the failure 201 does not occur in the first power supply 10 (step S315, No), the controller 3A ends the processing. Accordingly, the controller 3A can continue a first FOP.

When it is determined that the failure 201 occurs in the first power supply 10 (step S315, Yes), the controller 3A determines whether the second fail-safe control permission flag is set to "1" (step S316). When it is determined that the fail-safe control permission flag is not set to "1" (step S316, No), the controller 3A advances the processing to step S320.

When it is determined that the fail-safe control permission flag is set to "1" (step S316, Yes), the controller 3A brings the first connection device 41 into the conductive state (step S317). Accordingly, the controller 3A can perform the second FOP by supplying electric power from the second power supply 20 to the second load 102 and the third load 103 via the first connection device 41.

In this way, when the ground fault 200 of the second system 120 is detected, the controller 3A performs the second FOP in a case where the ground fault 200 occurs between the second system load and any one of the first to third load switches SW1 to SW3 which are the second connection devices. Accordingly, the controller 3A can reliably perform the second FOP.

Thereafter, the controller 3A determines whether a voltage of the first system 110 returns to a value exceeding the ground fault threshold (step S318). When it is determined that the voltage of the first system 110 returns to the value exceeding the ground fault threshold (step S318, Yes), the controller 3A executes disconnection control processing for the second connection devices (step S321).

The second connection devices here are the first to third load switches SW1 to SW3. Specific examples of the disconnection control processing for the second connection devices will be described later with reference to FIGS. 17 and 18. Thereafter, the controller 3A ends the processing.

When it is determined that the voltage of the first system 110 does not return to the value exceeding the ground fault threshold (step S318, No), the controller 3A brings the first connection device 41 into the disconnected state (step S319).

The fact that the controller 3A executes the processing of step S319 means that the first power supply 10 is failed (step S315, Yes) and a ground fault occurs in the first system 110 (step S318, No), and thus the first power supply 10 and the second power supply 20 can not be used for the FOP. The fact that the controller 3A determines No in step S316 means that the first power supply 10 is failed (step S315, Yes) and a ground fault occurs between the second connection devices and the second power supply 20 in the second system 120 (step S316, No), and thus the first power supply 10 and the second power supply 20 can not be used for the FOP in this case either.

Therefore, the controller 3A notifies of the failures of the first system 110 and the second system 120 (step S320). Then, the controller 3A ends the processing. Accordingly, the controller 3A can stop the second FOP, and make a driver of a vehicle recognize that the failures occur in the first system 110 and the second system 120.

9. Ground Fault Location Identification Processing

Next, an example of the ground fault location identification processing (step S312) executed by the controller 3A of the power supply control apparatus 1A according to the second embodiment will be described with reference to FIG. 16.

Figure 16:
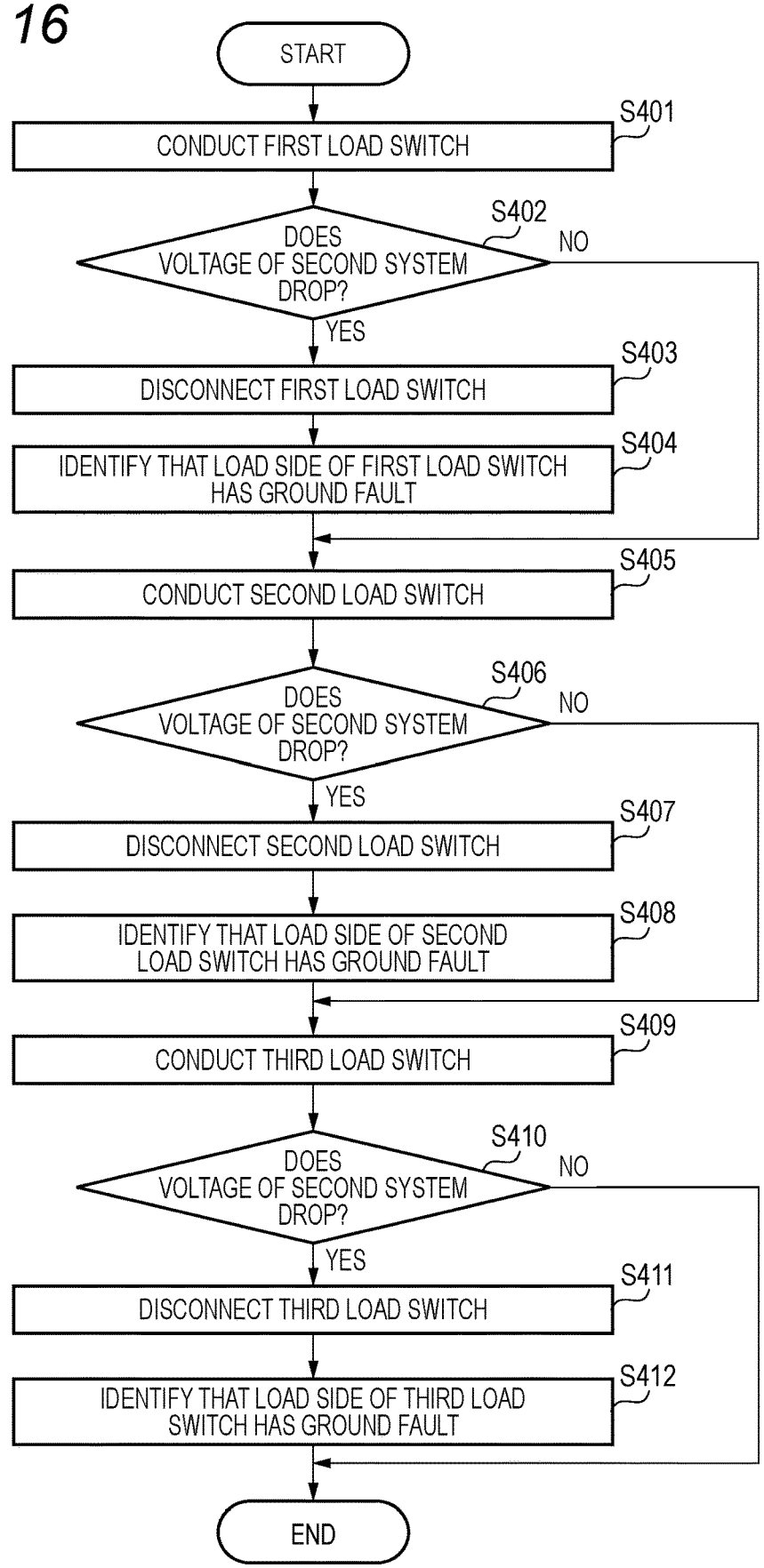
FIG. 16 is a flowchart showing an example of processing executed by the controller of the power supply control apparatus according to the second embodiment.

As shown in FIG. 16, when the controller 3A starts the ground fault location identification processing, first, the controller 3A brings the first load switch SW1 which is the second connection device into the conductive state (step S401). Subsequently, the controller 3A determines whether the voltage of the second system 120 drops to a value equal to or less than the ground fault threshold (step S402). When it is determined that the voltage of the second system 120 does not drop to the value equal to or less than the ground fault threshold (step S402, No), the controller 3A advances the processing to step S405.

When it is determined that the voltage of the second system 120 drops to the value equal to or less than the ground fault threshold (step S402, Yes), the controller 3A brings the first load switch SW1 into the disconnected state (step S403). Then, the controller 3A identifies that a side at the second system load of the first load switch SW1, that is, a side at the second load 102 has the ground fault 200 (step S404).

Thereafter, the controller 3A brings the second load switch SW2 which is the second connection device into the conductive state (step S405). Subsequently, the controller 3A determines whether the voltage of the second system 120 drops to the value equal to or less than the ground fault threshold (step S406). When it is determined that the voltage of the second system 120 does not drop to the value equal to or less than the ground fault threshold (step S406, No), the controller 3A advances the processing to step S409.

When it is determined that the voltage of the second system 120 drops to the value equal to or less than the ground fault threshold (step S406, Yes), the controller 3A brings the second load switch SW2 into the disconnected state (step S407). Then, the controller 3A identifies that a side at the second system load of the second load switch SW2, that is, a side at the third load 103 has the ground fault 200 (step S408).

Thereafter, the controller 3A brings the third load switch SW3 which is the second connection device into the conductive state (step S409). Subsequently, the controller 3A determines whether the voltage of the second system 120 drops to the value equal to or less than the ground fault threshold (step S410). When it is determined that the voltage of the second system 120 does not drop to the value equal to or less than the ground fault threshold (step S410, No), the controller 3A ends the processing.

When it is determined that the voltage of the second system 120 drops to the value equal to or less than the ground fault threshold (step S410, Yes), the controller 3A brings the third load switch SW3 into the disconnected state (step S411). Then, the controller 3A identifies that a side at the second system load of the third load switch SW3, that is, a side at the fourth load 104 has the ground fault 200 (step S412). Thereafter, the controller 3A ends the ground fault location identification processing.

In this way, when the first FOP is performed, in a case where the ground fault 200 of the second system 120 occurs between one of the second connection devices and one of the second system loads, the controller 3A brings the one second connection device into the disconnected state, and brings the first connection device 41 and the other second connection devices into the conductive state.

For example, if the ground fault 200 occurs between the first load switch SW1 and the second load 102, the controller 3A brings the first load switch SW1 into the disconnected state. Then, the controller 3A brings the first connection device 41, the second load switch SW2, and the third load switch SW3 into the conductive state.

In this case, the controller 3A can improve a control of the first FOP by using the third load 103 and the fourth load 104 which are available second system loads, without using the unavailable second load 102.

When it is determined that the second system 120 has the ground fault 200, the controller 3A repeats, for each of the second connection devices, processing of bringing one of the second connection devices into the conductive state and bringing the other second connection devices into the disconnected state. Then, if the voltage of the second system 120 drops when one of the second connection devices is brought into the conductive state, the controller 3A determines that a load side of the second connection device brought into the conductive state has the ground fault 200.

In addition, if the voltage of the second system 120 does not return even if all the second connection devices are brought into the disconnected state, the controller 3A determines that a power supply side of the second connection devices has the ground fault 200. Accordingly, the controller 3A can accurately identify an occurrence location of the ground fault 200 in the second system 120.

10. Disconnection Control Processing for Second Connection Devices

Next, an example of the disconnection control processing for the second connection devices (step S321) executed by the controller 3A of the power supply control apparatus 1A according to the second embodiment will be described with reference to FIG. 17.

Figure 17:
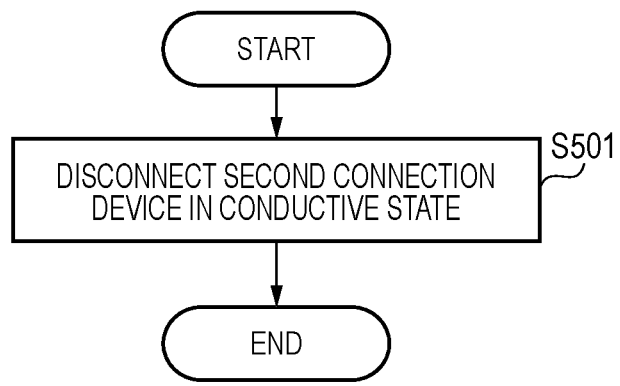
FIG. 17 is a flowchart showing an example of processing executed by the controller of the power supply control apparatus according to the second embodiment.
Figure 18:
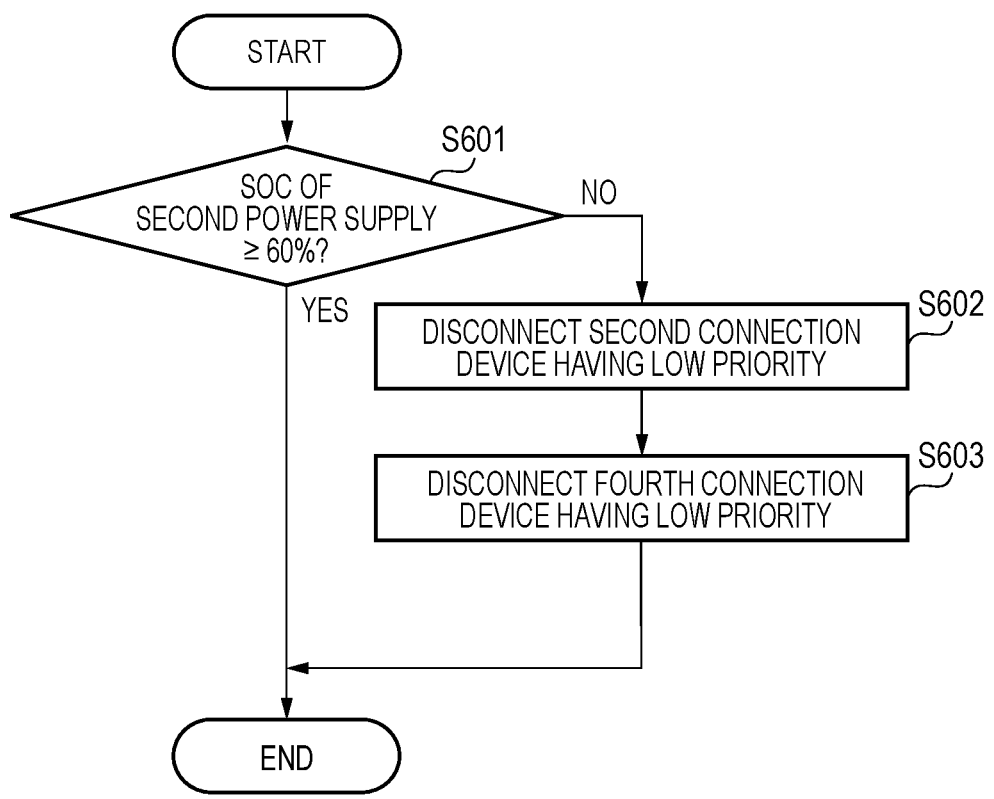
FIG. 18 is a flowchart showing a modification of the processing executed by the controller of the power supply control apparatus according to the second embodiment.

As shown in FIG. 17, when the controller 3A starts the disconnection control processing for the second connection devices, the controller 3A brings a second connection device in the conductive state into the disconnected state (step S501). Specifically, the controller 3A brings a second connection device that is not brought into the disconnected state, among the first to third load switches SW1 to SW3 which are the second connection devices, to the disconnected state after being brought into the conductive state in the ground fault location identification processing shown in FIG. 16. Thereafter, the controller 3A ends the processing.

In this way, when the second FOP is performed, the controller 3A brings a second connection device in which the ground fault 200 does not occur on a load side thereof into the disconnected state. Accordingly, the controller 3A can prevent electric power consumption of the second power supply 20 and can increase an operable time of the second FOP as compared to a case where the second connection device is not brought into the disconnected state.

11. Modification of Disconnection Control Processing for Second Connection Devices Next, a modification of the disconnection control processing for the second connection devices (step S321) executed by the controller 3A of the power supply control apparatus 1A according to the second embodiment will be described with reference to FIG. 18.

As shown in FIG. 18, when the controller 3A starts disconnection control processing according to the modification for the second connection devices, the controller 3A determines whether SOC of the second power supply 20 is 60% or more (step S601). For example, the controller 3A instructs a measurement device of the second power supply 20 to measure a voltage of the LiB 21.

The controller 3A acquires voltage information of the LiB 21 from the measurement device. The controller 3A detects SOC of the LiB 21 based on the acquired voltage information. Then, with the detected SOC of the LiB 21 as the SOC of the second power supply 20, the controller 3A determines whether the SOC of the second power supply 20 is 60% or more.

When it is determined that the SOC of the second power supply 20 is 60% or more (step S601, Yes), the controller 3A ends the processing. That is, a second connection device in which no ground fault occurs in the ground fault location identification processing of step S312 is conducted, and thus the controller 3A continues the second FOP in this state. When it is determined that the SOC of the second power supply 20 is not 60% or more (step S610, No), that is, the SOC of the second power supply 20 is less than 60%, the controller 3A brings a second connection device having a low priority into the disconnected state (step S602).

The second connection device having a low priority is a second connection device connected to a second system load having a low priority. The second system load having a low priority is a second system load that does not affect automatic driving or traveling of the vehicle itself. The second system load that does not affect the automatic driving or the traveling of the vehicle itself includes, for example, a display, an air conditioner, an audio, a video, and various lights.

A second connection device having a high priority is a second connection device connected to a second system load having a high priority. The second system load having a high priority is a second system load that affects the automatic driving or the traveling of the vehicle itself. The second system load that affects the automatic driving or the traveling of the vehicle itself includes, for example, a steering motor, an electric brake device, various sensors, and an in-vehicle camera.

When the second FOP is performed, the controller 3A can also bring a second connection device in the conductive state corresponding to the second system load having a lower priority into the disconnected state as a charge amount of the second power supply 20 is lower. Accordingly, the controller 3A can increase the operable time of the second FOP while increasing an accuracy of the second FOP.

Thereafter, the controller 3A brings the fourth connection device having a lower priority among the fourth load switch SW4 and the fifth load switch SW5 which are the fourth connection devices into the disconnected state (step S603).

The fourth connection device having a low priority is a fourth connection device connected to a first system load having a low priority. The first system load having a low priority is a first system load that does not affect the automatic driving or the traveling of the vehicle itself. The first system load that does not affect the automatic driving or the traveling of the vehicle itself includes, for example, a display, an air conditioner, an audio, a video, and various lights.

A fourth connection device having a high priority is a fourth connection device connected to a first system load having a high priority. The first system load having a high priority is a first system load that affects the automatic driving or the traveling of the vehicle itself. The first system load that affects the automatic driving or the traveling of the vehicle itself includes, for example, a steering motor, an electric brake device, various sensors, and an in-vehicle camera.

When the second FOP is performed, the controller 3A can also bring a fourth connection device corresponding to the first system load having a lower priority into the disconnected state as the charge amount of the second power supply 20 is lower. Accordingly, the controller 3A can increase the operable time of the second FOP while increasing the accuracy of the second FOP.

In this way, when the second FOP is performed, the controller 3A brings a connection device corresponding to a load having a lower priority into a disconnected state as the charge amount of the second power supply 20 is lower. Accordingly, the controller 3A can increase the operable time of the second FOP while increasing the accuracy of the second FOP.

12. Appendixes

As appendixes, the features of the present invention are shown as follows.

(1) A power supply control apparatus including:
a first connection device provided in an inter-system line that connects a first system configured to supply electric power of a first power supply to a first system load and a second system configured to supply electric power of a second power supply to a second system load;
a second connection device provided between the second system load and a connection point between the second system and the inter-system line and; and
a controller that brings the first connection device and the second connection device into a disconnected state and performs a first fail-safe control using the electric power of the first power supply when a ground fault of the second system is detected, and that brings the first connection device into a conductive state while keeping the second connection device in a disconnected state and performs a second fail-safe control using the electric power of the second power supply when a failure of the first power supply is detected during the first fail-safe control.

(2) The power supply control apparatus according to (1), in which if a voltage of the first system returns as a result of performing the second fail-safe control, the controller keeps a conductive state of the first connection device.

(3) The power supply control apparatus according to (1) or (2), in which
if a voltage of the first system does not return as a result of performing the second fail-safe control, the controller brings the first connection device into a disconnected state.

(4) The power supply control apparatus according to (3), in which
if the voltage of the first system does not return as a result of performing the second fail-safe control, the controller notifies that both the first system and the second system are failed.

(5) The power supply control apparatus according to any one of (1) to (4), in which
the first power supply includes an electrical power generator, and
the controller detects that the first power supply is failed when receiving a notification indicating an abnormality of the electrical power generator from an external device configured to monitor a state of the electrical power generator.

(6) The power supply control apparatus according to any one of (1) to (5), in which
when the ground fault of the second system is detected, the controller performs the second fail-safe control in a case where the ground fault occurs between the second connection device and the second system load.

(7) The power supply control apparatus according to (6), in which
when the ground fault of the second system is detected, the controller determines that a side at the second system load of the second connection device has a ground fault if a voltage of the second system returns by bringing the second connection device into a disconnected state, and determines that a side at the second power supply of the second connection device has a ground fault if the voltage of the second system does not return.

(8) The power supply control apparatus according to any one of (1) to (7), further including:
a third connection device configured to connect the second power supply to the second system, in which
when the ground fault of the second system is detected, the controller brings the first connection device and the third connection device into a disconnected state to prohibit the second fail-safe control in a case where the ground fault occurs between the second connection device and the second power supply.

(9) The power supply control apparatus according to any one of (1) to (8), in which
the second system load includes a plurality of second system loads,
the second connection device is provided between the connection point and each of the plurality of second system loads, and
when the first fail-safe control is performed, in a case where the ground fault of the second system occurs between one of the second connection devices and one of the second system loads, the controller brings the one second connection device into a disconnected state and brings the first connection device and the other second connection devices into a conductive state.

(10) The power supply control apparatus according to (9), in which when it is determined that the second system has a ground fault, the controller repeats, for each of the second connection devices, processing of bringing one of the second connection devices into a conductive state and bringing the other second connection devices into a disconnected state, determines that a side at the second system load of one of the second connection devices has a ground fault if a voltage of the second system drops when the one second connection device is brought into a conductive state, and determines that a side at the second power supply of the second connection devices has a ground fault if the voltage of the second system does not return even if all the second connection devices are in a disconnected state.

(11) The power supply control apparatus according to (9) or (10), in which when the second fail-safe control is performed, the controller brings the other second connection devices into a disconnected state.

(12) The power supply control apparatus according to any one of (9) to (11), in which when the second fail-safe control is performed, the controller brings the other second connection device corresponding to the second system load having a lower priority into a disconnected state as a charge amount of the second power supply is lower.

(13) The power supply control apparatus according to any one of (9) to (12), in which the first system load includes a plurality of first system loads, a fourth connection device is provided between the first system and each of the plurality of first system loads, and when the second fail-safe control is performed, the controller brings the fourth connection device corresponding to the first system load having a lower priority into a disconnected state as a charge amount of the second power supply is lower.

(14) The power supply control apparatus according to any one of (9) to (13), in which when the second fail-safe control is performed, the controller brings a connection device corresponding to a load having a lower priority into a disconnected state as a charge amount of the second power supply is lower.

(15) A power supply control method performed by a controller of a power supply control apparatus, the power supply control apparatus including a first connection device provided in an inter-system line that connects a first system configured to supply electric power of a first power supply to a first system load and a second system configured to supply electric power of a second power supply to a second system load, and a second connection device provided between the second system load and a connection point between the second system and the inter-system line, wherein the method includes:

bringing the first connection device and the second connection device into a disconnected state and performing a first fail-safe control using the electric power of the first power supply when a ground fault of the second system is detected; and bringing the first connection device into a conductive state while keeping the second connection device in a disconnected state and performing a second fail-safe control using the electric power of the second power supply when a failure of the first power supply is detected during the first fail-safe control.

Additional effects and modifications can be easily derived by those skilled in the art. Therefore, broader aspects of the present invention are not limited to the specific details and the representative embodiments shown and described above. Therefore, various modifications can be made without departing from the spirit or scope of the general inventive concept as defined by the appended claims and equivalents of the claims.

REFERENCE SIGNS LIST

1: power supply control apparatus
10: first power supply
11: PbB
12: generator
20: second power supply
21: LiB
3: controller
41: first connection device
42: second connection device
43: third connection device
51: first voltage sensor
52: second voltage sensor
100: external device
101: first load
102: second load
103: third load
104: fourth load
110: first system
111: notification device
120: second system
130: inter-system line
P: connection point
SW1: first load switch
SW2: second load switch
SW3: third load switch
SW4: fourth load switch
SW5: fifth load switch

What is claimed is:

1. A power supply control apparatus comprising:

a first connection device provided in an inter-system line that connects (i) a first system configured to supply electric power of a first power supply to a first system load and a second system load and (ii) a second system configured to supply electric power of a second power supply to the second system load;

a second connection device provided between the second system load and a connection point between the second system and the inter-system line;

a first voltage sensor provided in the first system and configured to detect a voltage of the first system;

a second voltage sensor provided in the second system and configured to detect a voltage of the second system; and a controller that performs a first fail-safe control by bringing the first connection device and the second connection device into a disconnected state so that the electric power of the first power supply is supplied to the first system load and the second system load when a ground fault of the second system is detected by comparing the voltage detected by the first voltage sensor and the voltage detected by the second voltage sensor to a ground fault threshold and determining that the voltage detected by the second voltage sensor is equal to or less than the ground fault threshold, and that performs a second fail-safe control by bringing the first connection device into a conductive state while keeping the second connection device in a disconnected state so that the electric power of the second power supply is supplied to the second system load through the first connection device and the first system when a failure of the first power supply is detected during the first fail-safe control.

2. The power supply control apparatus according to claim 1, wherein
in a case where a voltage of the first system detected by the first voltage sensor returns as a result of performing the second fail-safe control, the controller keeps a conductive state of the first connection device.

3. The power supply control apparatus according to claim 1, wherein
in a case where a voltage of the first system detected by the first voltage sensor does not return as a result of performing the second fail-safe control, the controller brings the first connection device into a disconnected state.

4. The power supply control apparatus according to claim 3, wherein
in a case where the voltage of the first system detected by the first voltage sensor does not return as a result of performing the second fail-safe control, the controller notifies that both of the first system and the second system are failed.

5. The power supply control apparatus according to claim 1, wherein
the first power supply comprises an electrical power generator, and
the controller detects that the first power supply is failed when receiving a notification indicating an abnormality of the electrical power generator from an external device configured to monitor a state of the electrical power generator.

6. The power supply control apparatus according to claim 1, wherein
when the ground fault of the second system is detected, the controller performs the second fail-safe control in a case where the ground fault occurs between the second connection device and the second system load.

7. The power supply control apparatus according to claim 6, wherein
when the ground fault of the second system is detected, the controller determines that a side at the second system load of the second connection device has a ground fault in a case where a voltage of the second system detected by the second voltage sensor returns by bringing the second connection device into a disconnected state, and determines that a side at the second power supply of the second connection device has a ground fault in a case where the voltage of the second system detected by the second voltage sensor does not return.

8. The power supply control apparatus according to claim 1, further comprising:
a third connection device configured to connect the second power supply to the second system, wherein
when the ground fault of the second system is detected, the controller brings the first connection device and the third connection device into a disconnected state to prohibit the second fail-safe control in a case where the ground fault occurs between the second connection device and the second power supply.

9. The power supply control apparatus according to claim 1, wherein
the second system load comprises a plurality of second system loads,
the second connection device is provided between the connection point and each of the plurality of second system loads, and
when the first fail-safe control is performed, in a case where the ground fault of the second system occurs between one of the second connection devices and one of the second system loads, the controller brings the one of the second connection devices into a disconnected state and brings the first connection device and other of the second connection devices into a conductive state.

10. The power supply control apparatus according to claim 9, wherein
when the second system is determined to have a ground fault, the controller repeats, for each of the second connection devices, processing of bringing one of the second connection devices into a conductive state and bringing other of the second connection devices into a disconnected state,
determines that a side at the second system load of one of the second connection devices has a ground fault in a case where a voltage of the second system detected by the second voltage sensor drops when the one of the second connection devices is brought into a conductive state, and
determines that a side at the second power supply of the second connection devices has a ground fault in a case where the voltage of the second system detected by the second voltage sensor does not return even in a case where all the second connection devices are in a disconnected state.

11. The power supply control apparatus according to claim 9, wherein
when the second fail-safe control is performed, the controller brings the other of the second connection devices into a disconnected state.

12. The power supply control apparatus according to claim 9, wherein
when the second fail-safe control is performed, the controller brings the other of the second connection devices corresponding to the second system load having a lower priority into a disconnected state as a charge amount of the second power supply is lower.

13. The power supply control apparatus according to claim 9, wherein
the first system load comprises a plurality of first system loads,
a fourth connection device is provided between the first system and each of the plurality of first system loads, and
when the second fail-safe control is performed, the controller brings the fourth connection device corresponding to the first system load having a lower priority into a disconnected state as a charge amount of the second power supply is lower.

14. The power supply control apparatus according to claim 9, wherein
when the second fail-safe control is performed, the controller brings a connection device corresponding to a load having a lower priority into a disconnected state as a charge amount of the second power supply is lower.

15. A power supply control method performed by a controller of a power supply control apparatus, the power supply control apparatus including (1) a first connection device provided in an inter-system line that connects (i) a first system configured to supply electric power of a first power supply to a first system load and a second system load and (ii) a second system configured to supply electric power of a second power supply to the second system load, (2) a second connection device provided between the second system load and a connection point between the second system and the inter-system line, (3) a first voltage sensor provided in the first system and configured to detect a voltage of the first system, and (4) a second voltage sensor provided in the second system and configured to detect a voltage of the second system, wherein the method comprises:

performing a first fail-safe control by bringing the first connection device and the second connection device into a disconnected state so that the electric power of the first power supply is supplied to the first system load and the second system load when a ground fault of the second system is detected by comparing the voltage detected by the first voltage sensor and the voltage detected by the second voltage sensor to a ground fault threshold and determining that the voltage detected by the second voltage sensor is equal to or less than the ground fault threshold; and performing a second fail-safe control by bringing the first connection device into a conductive state while keeping the second connection device in a disconnected state so that the electric power of the second power supply is supplied to the second system load through the first connection device and the first system when a failure of the first power supply is detected during the first fail-safe control.

16. A power supply control apparatus comprising:

a first connection device provided in an inter-system line that connects a first power supply line to a second power supply line, the first power supply line extending from a first power supply to a first system load and a second system load and being configured to supply electric power of the first power supply to the first system load and to the second system load, the second power supply line extending from a second power supply to the second system load and being configured to supply electric power of the second power supply to the second system load;

a second connection device provided between the second system load and a connection point between the second power supply line and the inter-system line;

a first voltage sensor provided in the first power supply line and configured to detect a voltage of the first power supply line;

a second voltage sensor provided in the second power supply line and configured to detect a voltage of the second power supply line; and a controller that performs (i) a first fail-safe control by bringing the first connection device and the second connection device into a disconnected state so that the electric power of the first power supply is supplied by the first power supply line to the first system load and to the second system load when a ground fault of the second power supply line is detected by comparing the voltage detected by the first voltage sensor and the voltage detected by the second voltage sensor to a ground fault threshold and determining that the voltage detected by the second voltage sensor is equal to or less than the ground fault threshold, and that performs (ii) a second fail-safe control by bringing the first connection device into a conductive state while keeping the second connection device in a disconnected state so that the electric power of the second power supply is supplied by the inter-system line and the first power supply line to the second system load when a failure of the first power supply is detected during the first fail-safe control.

\* \* \* \* \*